(12) United States Patent
He et al.

(10) Patent No.: US 12,068,492 B2
(45) Date of Patent: Aug. 20, 2024

(54) POWER BATTERY PACK AND ELECTRIC VEHICLE

(71) Applicant: BYD COMPANY LIMITED, Guangdong (CN)

(72) Inventors: Long He, Shenzhen (CN); Huajun Sun, Shenzhen (CN); Wenfeng Jiang, Shenzhen (CN); Zhipei Lu, Shenzhen (CN); Weixin Zheng, Shenzhen (CN); Jianglong Tang, Shenzhen (CN); Yan Zhu, Shenzhen (CN); Xinyue Wang, Shenzhen (CN); Kefeng He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 451 days.

(21) Appl. No.: 17/421,895

(22) PCT Filed: Jun. 21, 2019

(86) PCT No.: PCT/CN2019/092393
§ 371 (c)(1),
(2) Date: Jul. 9, 2021

(87) PCT Pub. No.: WO2020/143177
PCT Pub. Date: Jul. 16, 2020

(65) Prior Publication Data
US 2022/0118841 A1    Apr. 21, 2022

(30) Foreign Application Priority Data

Jan. 9, 2019   (CN) .......................... 201910020925.5
Jan. 9, 2019   (CN) .......................... 201910020967.9

(Continued)

(51) Int. Cl.
*B60K 1/04*    (2019.01)
*B60L 50/60*   (2019.01)
(Continued)

(52) U.S. Cl.
CPC ............. *H01M 50/209* (2021.01); *B60K 1/04* (2013.01); *B60L 50/64* (2019.02); *B60L 50/66* (2019.02);
(Continued)

(58) Field of Classification Search
CPC ............................................ B60K 2001/0438
See application file for complete search history.

(56) References Cited

U.S. PATENT DOCUMENTS 5,620,057 A    4/1997   Klemen
7,618,740 B2   11/2009  Hamada et al.
(Continued)

FOREIGN PATENT DOCUMENTS

CN    1134041 A      10/1996
CN    101034753      9/2007
(Continued)

OTHER PUBLICATIONS

Office Action from U.S. Appl. No. 17/049,732 dated Jan. 18, 2023.
(Continued)

*Primary Examiner* — Brian L Swenson
(74) *Attorney, Agent, or Firm* — Calfee, Halter & Griswold LLP

(57) ABSTRACT

Provided are a power battery pack and an electric vehicle. The power battery pack includes: a pack body, where an accommodating space is defined in the pack body, the pack body is provided therein with at least one widthwise cross beam or lengthwise cross beam, the widthwise cross beam extends along a width direction of the power battery pack, the lengthwise cross beam extends along a length direction (Continued)

of the power battery pack, and the accommodating space is divided into a plurality of accommodating chambers by the at least one widthwise cross beam or lengthwise cross beam; and a plurality of cells, disposed in the pack body and directly arranged in the accommodating chambers, where at least one cell is arranged in each accommodating chamber to form a cell array.

33 Claims, 11 Drawing Sheets

(30) Foreign Application Priority Data

| Jan. 9, 2019 | (CN) | 201910021244.0 |
| Jan. 9, 2019 | (CN) | 201910021246.X |
| Jan. 9, 2019 | (CN) | 201910021247.4 |
| Jan. 9, 2019 | (CN) | 201910021248.9 |

(51) Int. Cl.

| B60L 50/64 | (2019.01) |
| H01M 10/052 | (2010.01) |
| H01M 10/42 | (2006.01) |
| H01M 10/613 | (2014.01) |
| H01M 10/625 | (2014.01) |
| H01M 10/647 | (2014.01) |
| H01M 10/6551 | (2014.01) |
| H01M 10/6554 | (2014.01) |
| H01M 50/103 | (2021.01) |
| H01M 50/119 | (2021.01) |
| H01M 50/209 | (2021.01) |
| H01M 50/244 | (2021.01) |
| H01M 50/249 | (2021.01) |
| H01M 50/271 | (2021.01) |
| H01M 50/317 | (2021.01) |
| H01M 50/342 | (2021.01) |
| H01M 50/35 | (2021.01) |
| H01M 50/383 | (2021.01) |
| H01M 50/531 | (2021.01) |
| H01M 50/543 | (2021.01) |
| B60L 58/26 | (2019.01) |

(52) U.S. Cl.
CPC ....... *H01M 10/052* (2013.01); *H01M 10/425* (2013.01); *H01M 10/613* (2015.04); *H01M 10/625* (2015.04); *H01M 10/647* (2015.04); *H01M 10/6551* (2015.04); *H01M 10/6554* (2015.04); *H01M 50/103* (2021.01); *H01M 50/119* (2021.01); *H01M 50/244* (2021.01); *H01M 50/249* (2021.01); *H01M 50/271* (2021.01); *H01M 50/317* (2021.01); *H01M 50/342* (2021.01); *H01M 50/3425* (2021.01); *H01M 50/35* (2021.01); *H01M 50/383* (2021.01); *H01M 50/531* (2021.01); *H01M 50/543* (2021.01); *B60K 2001/0405* (2013.01); *B60K 2001/0438* (2013.01); *B60L 58/26* (2019.02); *H01M 2010/4271* (2013.01); *H01M 2220/20* (2013.01)

(56) References Cited

U.S. PATENT DOCUMENTS

| 8,268,469 B2 | 9/2012 | Hermann et al. |
| 8,642,204 B2 | 2/2014 | Higashino et al. |
| 8,910,737 B2 | 12/2014 | Saeki |
| 9,017,845 B2 | 4/2015 | Bender et al. |
| 9,283,837 B1 | 3/2016 | Rawlinson |
| 9,306,201 B2 | 4/2016 | Lu et al. |
| 9,337,458 B2 | 5/2016 | Kim |
| 9,437,854 B2 | 9/2016 | Shimizu et al. |
| 9,444,082 B2 | 9/2016 | Tsujimura et al. |
| 9,806,312 B2 | 10/2017 | Li et al. |
| 9,806,386 B2 | 10/2017 | Lim |
| 9,843,027 B1 | 12/2017 | Spotnitz |
| 10,059,382 B2 | 8/2018 | Nusier et al. |
| 10,099,546 B2 | 10/2018 | Hara et al. |
| 11,088,412 B2* | 8/2021 | Matecki ............... H01M 50/204 |
| 2002/0086578 A1 | 7/2002 | Ikeda |
| 2003/0152825 A1 | 8/2003 | Siddiqui et al. |
| 2004/0058233 A1 | 3/2004 | Hamada et al. |
| 2007/0015049 A1 | 1/2007 | Hamada et al. |
| 2009/0136806 A1 | 5/2009 | Imanishi et al. |
| 2011/0003198 A1 | 1/2011 | Noda et al. |
| 2011/0027632 A1 | 2/2011 | Higashino et al. |
| 2011/0174556 A1 | 7/2011 | Hermann et al. |
| 2012/0028105 A1 | 2/2012 | Kumar et al. |
| 2012/0114993 A1 | 5/2012 | Park |
| 2012/0261206 A1 | 10/2012 | Yasui et al. |
| 2013/0130070 A1 | 5/2013 | Adachi et al. |
| 2013/0175829 A1* | 7/2013 | Kim ..................... B60L 50/64 |
| | | 296/204 |
| 2014/0020969 A1 | 1/2014 | Okada et al. |
| 2014/0072835 A1* | 3/2014 | Tsujimura ......... H01M 10/6562 |
| | | 429/7 |
| 2014/0093756 A1 | 4/2014 | Nemoto et al. |
| 2014/0120391 A1 | 5/2014 | Park |
| 2014/0127537 A1 | 5/2014 | Pflueger et al. |
| 2014/0186677 A1 | 7/2014 | Lim |
| 2014/0308550 A1 | 10/2014 | Shimizu et al. |
| 2015/0081298 A1 | 3/2015 | Ding et al. |
| 2015/0086842 A1 | 3/2015 | Kang et al. |
| 2015/0140369 A1 | 5/2015 | Itoi |
| 2015/0303422 A1 | 10/2015 | Poller et al. |
| 2016/0006006 A1 | 1/2016 | Motokawa et al. |
| 2016/0064781 A1 | 3/2016 | Specht et al. |
| 2016/0093843 A1 | 3/2016 | Reineccius et al. |
| 2016/0133889 A1 | 5/2016 | Tseng et al. |
| 2016/0133900 A1 | 5/2016 | Li et al. |
| 2016/0133901 A1 | 5/2016 | Li et al. |
| 2016/0141738 A1 | 5/2016 | Kwag |
| 2016/0167544 A1 | 6/2016 | Barbat et al. |
| 2016/0204404 A1 | 7/2016 | Shimizu et al. |
| 2016/0226034 A1 | 8/2016 | Seok et al. |
| 2016/0301045 A1 | 10/2016 | Tyler et al. |
| 2017/0088182 A1 | 3/2017 | Hara |
| 2017/0190264 A1 | 7/2017 | Kim et al. |
| 2017/0214008 A9 | 7/2017 | Mardall et al. |
| 2017/0237113 A1 | 8/2017 | Reuhle et al. |
| 2017/0331090 A1 | 11/2017 | Li et al. |
| 2018/0013105 A1* | 1/2018 | Wuensche .......... H01M 10/425 |
| 2018/0013113 A1 | 1/2018 | Wuensche et al. |
| 2018/0029493 A1 | 2/2018 | Kobayashi et al. |
| 2018/0166735 A1 | 6/2018 | Busacca et al. |
| 2018/0194235 A1 | 7/2018 | Kim et al. |
| 2018/0229593 A1 | 8/2018 | Hitz et al. |
| 2018/0287213 A1 | 10/2018 | Sato et al. |
| 2018/0337374 A1 | 11/2018 | Matecki |
| 2018/0337378 A1 | 11/2018 | Stephens |
| 2018/0358593 A1 | 12/2018 | Seo et al. |
| 2018/0366717 A1 | 12/2018 | Hu et al. |
| 2019/0044114 A1 | 2/2019 | DeMar |
| 2020/0140018 A1 | 5/2020 | Frottke |
| 2020/0212385 A1* | 7/2020 | Shi ..................... H01M 50/249 |
| 2020/0295322 A1* | 9/2020 | Günther ............ H01M 50/249 |

FOREIGN PATENT DOCUMENTS

| CN | 101079477 | 11/2007 |
| CN | 101145059 | 3/2008 |
| CN | 101305488 | 11/2008 |
| CN | 201146206 Y | 11/2008 |
| CN | 101521265 | 9/2009 |
| CN | 101877413 A | 11/2010 |
| CN | 201766132 U | 3/2011 |
| CN | 102104122 | 6/2011 |
| CN | 202034426 U | 11/2011 |

(56) References Cited

FOREIGN PATENT DOCUMENTS

| | | |
|---|---|---|
| CN | 202210539 U | 5/2012 |
| CN | 202217748 U | 5/2012 |
| CN | 202268403 U | 6/2012 |
| CN | 202268412 U | 6/2012 |
| CN | 202332978 A | 7/2012 |
| CN | 202373642 U | 8/2012 |
| CN | 102683907 | 9/2012 |
| CN | 102893426 | 1/2013 |
| CN | 202712297 U | 1/2013 |
| CN | 102956934 | 3/2013 |
| CN | 102007619 B | 6/2013 |
| CN | 103269941 | 8/2013 |
| CN | 203150637 U | 8/2013 |
| CN | 103296302 | 9/2013 |
| CN | 103824984 A | 5/2014 |
| CN | 203600973 U | 5/2014 |
| CN | 103928642 | 7/2014 |
| CN | 103931020 | 7/2014 |
| CN | 203760534 U | 8/2014 |
| CN | 204130608 U | 10/2014 |
| CN | 102823054 B | 12/2014 |
| CN | 203983373 U | 12/2014 |
| CN | 204029891 U | 12/2014 |
| CN | 104319360 A | 1/2015 |
| CN | 204189846 U | 3/2015 |
| CN | 104576999 | 4/2015 |
| CN | 204577542 U | 5/2015 |
| CN | 104733667 A | 6/2015 |
| CN | 104795527 | 7/2015 |
| CN | 204857906 U | 7/2015 |
| CN | 204614833 U | 9/2015 |
| CN | 204651372 U | 9/2015 |
| CN | 204668376 U | 9/2015 |
| CN | 204732461 U | 10/2015 |
| CN | 105024112 A | 11/2015 |
| CN | 204809680 U | 11/2015 |
| CN | 204885223 U | 12/2015 |
| CN | 105244462 | 1/2016 |
| CN | 105322222 A | 2/2016 |
| CN | 105489828 | 4/2016 |
| CN | 205159465 U | 4/2016 |
| CN | 205282524 U | 6/2016 |
| CN | 205282525 U | 6/2016 |
| CN | 105762316 | 7/2016 |
| CN | 205488247 U | 8/2016 |
| CN | 103035975 B | 9/2016 |
| CN | 205621793 U | 10/2016 |
| CN | 106182714 | 12/2016 |
| CN | 106257714 | 12/2016 |
| CN | 106299166 | 1/2017 |
| CN | 205900631 U | 1/2017 |
| CN | 205900638 U | 1/2017 |
| CN | 106450089 | 2/2017 |
| CN | 205960060 U | 2/2017 |
| CN | 106486625 | 3/2017 |
| CN | 205992578 U | 3/2017 |
| CN | 206040913 U | 3/2017 |
| CN | 106558659 | 4/2017 |
| CN | 106558659 A | 4/2017 |
| CN | 106575728 A | 4/2017 |
| CN | 106605314 | 4/2017 |
| CN | 206134803 U | 4/2017 |
| CN | 206134820 U | 4/2017 |
| CN | 106627081 | 5/2017 |
| CN | 106654114 A | 5/2017 |
| CN | 106684287 | 5/2017 |
| CN | 206259400 U | 6/2017 |
| CN | 106953039 A | 7/2017 |
| CN | 106992273 A | 7/2017 |
| CN | 206364073 U | 7/2017 |
| CN | 107112443 | 8/2017 |
| CN | 206374545 U | 8/2017 |
| CN | 107123769 | 9/2017 |
| CN | 107195829 A | 9/2017 |
| CN | 206532801 U | 9/2017 |
| CN | 107248557 | 10/2017 |
| CN | 107256932 A | 10/2017 |
| CN | 107275710 | 10/2017 |
| CN | 107275710 A | 10/2017 |
| CN | 107293809 | 10/2017 |
| CN | 206595314 U | 10/2017 |
| CN | 107394063 A | 11/2017 |
| CN | 107394279 A | 11/2017 |
| CN | 107437594 | 12/2017 |
| CN | 107482141 A | 12/2017 |
| CN | 107611296 | 1/2018 |
| CN | 107611296 A | 1/2018 |
| CN | 107644962 | 1/2018 |
| CN | 206849954 U | 1/2018 |
| CN | 206864505 U | 1/2018 |
| CN | 206893769 U | 1/2018 |
| CN | 107681076 | 2/2018 |
| CN | 107768560 A | 3/2018 |
| CN | 107785511 | 3/2018 |
| CN | 107833996 | 3/2018 |
| CN | 207097887 U | 3/2018 |
| CN | 107887536 A | 4/2018 |
| CN | 107925028 | 4/2018 |
| CN | 107946506 | 4/2018 |
| CN | 107946692 | 4/2018 |
| CN | 207183353 U | 4/2018 |
| CN | 207233816 U | 4/2018 |
| CN | 207233915 U | 4/2018 |
| CN | 105845860 B | 5/2018 |
| CN | 107978800 A | 5/2018 |
| CN | 108011069 | 5/2018 |
| CN | 108075063 | 5/2018 |
| CN | 108075065 | 5/2018 |
| CN | 207381449 U | 5/2018 |
| CN | 207398218 U | 5/2018 |
| CN | 207425959 U | 5/2018 |
| CN | 207459036 U | 6/2018 |
| CN | 207474601 U | 6/2018 |
| CN | 207530003 U | 6/2018 |
| CN | 207559010 U | 6/2018 |
| CN | 207664083 U | 7/2018 |
| CN | 108370075 | 8/2018 |
| CN | 108389986 A | 8/2018 |
| CN | 108417747 | 8/2018 |
| CN | 207705320 U | 8/2018 |
| CN | 207743264 U | 8/2018 |
| CN | 207743294 U | 8/2018 |
| CN | 207781672 U | 8/2018 |
| CN | 207800740 U | 8/2018 |
| CN | 108493384 | 9/2018 |
| CN | 108598354 | 9/2018 |
| CN | 207818679 U | 9/2018 |
| CN | 207818697 U | 9/2018 |
| CN | 207818836 U | 9/2018 |
| CN | 207868256 U | 9/2018 |
| CN | 207967121 U | 10/2018 |
| CN | 207967123 U | 10/2018 |
| CN | 208014765 U | 10/2018 |
| CN | 208014778 U | 10/2018 |
| CN | 108749548 | 11/2018 |
| CN | 108777268 | 11/2018 |
| CN | 108933203 | 12/2018 |
| CN | 108933296 | 12/2018 |
| CN | 108963184 | 12/2018 |
| CN | 208189676 U | 12/2018 |
| CN | 208256735 U | 12/2018 |
| CN | 208256768 U | 12/2018 |
| CN | 208256770 U | 12/2018 |
| CN | 109148771 | 1/2019 |
| CN | 208336298 U | 1/2019 |
| CN | 109346637 A | 2/2019 |
| CN | 110088937 A | 8/2019 |
| CN | 110165115 A | 8/2019 |
| CN | 110165117 | 8/2019 |
| CN | 110190211 A | 8/2019 |
| CN | 110190212 A | 8/2019 |
| DE | 4407156 | 6/1995 |
| DE | 10328209 | 1/2005 |
| DE | 102017206566 | 10/2017 |

(56) References Cited

FOREIGN PATENT DOCUMENTS

| | | |
|---|---|---|
| DE | 202017101961 U | 7/2018 |
| DE | 102017204412 A1 | 9/2018 |
| DE | 102017209342 | 12/2018 |
| EP | 0638951 A2 | 2/1995 |
| EP | 1978578 | 10/2008 |
| EP | 2266151 A1 | 12/2010 |
| EP | 2490276 | 8/2012 |
| EP | 2562843 | 2/2013 |
| EP | 2565958 | 3/2013 |
| EP | 2654100 A1 | 10/2013 |
| EP | 2693515 | 2/2014 |
| EP | 3004246 | 4/2016 |
| EP | 2573834 B1 | 4/2017 |
| EP | 3279970 A1 | 2/2018 |
| EP | 2698862 | 5/2018 |
| EP | 3331055 | 6/2018 |
| EP | 3386001 | 10/2018 |
| EP | 3386002 | 10/2018 |
| EP | 3422441 A4 | 1/2019 |
| EP | 3021379 B1 | 7/2019 |
| EP | 3125334 | 10/2020 |
| EP | 3345783 A1 | 3/2022 |
| FR | 2951029 | 4/2011 |
| HK | 1207922 A1 | 2/2016 |
| JP | H 02138858 | 11/1990 |
| JP | H 07186734 | 7/1995 |
| JP | H 09274899 | 10/1997 |
| JP | 2000351328 | 12/2000 |
| JP | 2001256942 | 9/2001 |
| JP | 2001313009 | 11/2001 |
| JP | 2002298827 | 11/2001 |
| JP | 2002298827 A | 10/2002 |
| JP | 2003007345 A | 1/2003 |
| JP | 2006054189 | 2/2006 |
| JP | 2007027011 A | 2/2007 |
| JP | 2007134178 | 5/2007 |
| JP | 2008117765 A | 5/2008 |
| JP | 2008171628 | 7/2008 |
| JP | 2009277647 A | 11/2009 |
| JP | 2012064358 | 3/2012 |
| JP | 2012119138 A | 6/2012 |
| JP | 2012243438 | 12/2012 |
| JP | 2013069691 A | 4/2013 |
| JP | 5331517 B2 | 10/2013 |
| JP | 2013211197 | 10/2013 |
| JP | 5384432 B2 | 1/2014 |
| JP | 2014022277 | 2/2014 |
| JP | 2014080116 | 5/2014 |
| JP | 2014164795 | 9/2014 |
| JP | 2015022915 | 2/2015 |
| JP | 2015057759 | 3/2015 |
| JP | 2015118799 A | 6/2015 |
| JP | 5903607 B2 | 4/2016 |
| JP | 2016096129 A | 5/2016 |
| JP | 2016100308 | 5/2016 |
| JP | 2016122572 | 7/2016 |
| JP | 2017054683 | 3/2017 |
| JP | 2017111893 | 6/2017 |
| JP | 2017162806 | 9/2017 |
| JP | 2017196941 | 11/2017 |
| JP | 2017196959 | 11/2017 |
| JP | 2017197093 A | 11/2017 |
| JP | 2017228391 | 12/2017 |
| JP | 2018073552 | 5/2018 |
| JP | 2018106822 | 7/2018 |
| JP | 2018110048 | 7/2018 |
| JP | 2018527704 A | 9/2018 |
| JP | 2018176961 | 11/2018 |
| JP | 2018206495 | 12/2018 |
| JP | 2018536975 | 12/2018 |
| JP | 2019056716 A | 4/2019 |
| KR | 10-2009-0000307 | 1/2009 |
| KR | 20090000307 | 1/2009 |
| KR | 10-2012-0049020 | 5/2012 |
| KR | 20120049020 | 5/2012 |
| KR | 10-2013-0076660 | 7/2013 |
| KR | 20130076660 A | 7/2013 |
| KR | 20130116342 | 10/2013 |
| KR | 20130140245 | 12/2013 |
| KR | 20140042737 | 4/2014 |
| KR | 20140089067 A | 7/2014 |
| KR | 10-2014-0138674 | 12/2014 |
| KR | 20140138674 A | 12/2014 |
| KR | 20160076156 | 6/2016 |
| KR | 20160076156 A | 6/2016 |
| KR | 1020160094235 A | 8/2016 |
| KR | 101669118 A1 | 10/2016 |
| KR | 20170023595 | 3/2017 |
| KR | 20170023595 A | 3/2017 |
| KR | 20170044473 | 4/2017 |
| KR | 20170053429 | 5/2017 |
| KR | 20170090261 A | 8/2017 |
| KR | 1020180081000 A | 7/2018 |
| KR | 20180116339 A | 10/2018 |
| KR | 1020180112617 A | 10/2018 |
| KR | 1020190000211 A | 1/2019 |
| TW | 364221 | 7/1999 |
| TW | 200840170 | 10/2008 |
| TW | 200840170 A | 10/2008 |
| TW | I 319637 | 1/2010 |
| TW | I 525879 B | 3/2016 |
| WO | 2009128214 A1 | 10/2009 |
| WO | 2010114317 | 10/2010 |
| WO | 2012039013 | 3/2012 |
| WO | 2013031614 | 3/2013 |
| WO | 2013069308 | 5/2013 |
| WO | 2013161370 | 10/2013 |
| WO | 2014065110 A1 | 5/2014 |
| WO | 2015173999 | 11/2015 |
| WO | 2015186849 | 12/2015 |
| WO | 2016174855 | 11/2016 |
| WO | 2017078264 | 5/2017 |
| WO | 2017143754 A1 | 8/2017 |
| WO | 2018077979 | 5/2018 |
| WO | 2018087681 | 5/2018 |
| WO | 2018087681 A1 | 7/2018 |
| WO | 2018123574 A1 | 7/2018 |
| WO | 2018125641 | 7/2018 |
| WO | 2018186582 A1 | 10/2018 |
| WO | 2018198895 A1 | 11/2018 |
| WO | 2019001357 A1 | 1/2019 |
| WO | 2019127957 A1 | 7/2019 |

OTHER PUBLICATIONS

International Search Report of PCT/CN2019/092393 dated Oct. 8, 2019 (2 pages).
Office Action from U.S. Appl. No. 17/419,443 dated Aug. 1, 2023.
Office Action from U.S. Appl. No. 17/421,875 dated Oct. 2, 2023.
International Search Report of PCT/CN2019/097479 dated Oct. 16, 2019.
International Search Report of PCT/CN2019/097640 dated Oct. 16, 2019.
International Search Report of PCT/CN2019/092390 dated Sep. 6, 2019.
International Search Report of PCT/CN2019/098441 dated Sep. 27, 2019.
International Search Report of PCT/CN2019/092351 dated Oct. 11, 2019.
BYD Europe, Nail Penetration Test on the BYD Blade Battery and NCM Batter; https://www.youtube.com/watch?v=CSGEsKhtZD0; Published Sep. 26, 2021.
International Search Report of PCT/CN2019/092351 dated Oct. 11, 2019 (2 pages).

\* cited by examiner

POWER BATTERY PACK AND ELECTRIC VEHICLE

CROSS-REFERENCE TO RELATED APPLICATIONS

This application is a National Stage of PCT Application No. PCT/CN2019/092393, filed on Jun. 21, 2019, which claims priority to Chinese Patent Application Serial Nos. "201910021244.0", "201910020967.9", "201910021246.X", "201910021248.9", "201910021247.4", and "201910020925.5", filed by BYD Company Limited on Jan. 9, 2019, which are incorporated by reference in this application in their entireties.

FIELD

This application relates to the field of battery technologies, and specifically, to a power battery pack and an electric vehicle having the power battery pack.

BACKGROUND

In the related art, for example, a power battery pack, such as that applied to an electric vehicle, mainly includes a pack body and a plurality of battery modules mounted in the pack body. Each battery module is an assembly of a plurality of cells.

As users have increasingly high requirements on the battery life of electric vehicles, the use of a prior-art power battery pack in the limited space at the bottom of the vehicle leads to low space utilization. In addition, energy density of the power battery pack cannot meet the demand, which has gradually become an important factor hindering the development of electric vehicles.

SUMMARY

This application is intended to resolve at least one of the technical problems existing in the related art. Therefore, an objective of this application is to provide a power battery pack. The power battery pack has advantages of high space utilization, large energy density, long battery life, high reliability, low costs, high quality, and the like.

This application further provides an electric vehicle having the power battery pack.

An embodiment of a first aspect of this application provides a power battery pack, including: a pack body, where an accommodating space is defined in the pack body, the pack body is provided therein with at least one middle cross beam, and the accommodating space is divided into at least two accommodating chambers by the at least one middle cross beam; and a plurality of cells, disposed in the pack body and arranged in the accommodating chambers, where at least one cell is arranged in each accommodating chamber to form a cell array. The pack body includes a first side beam and a second side beam disposed opposite to each other at two sides of the accommodating space, the cell has a first end portion and a second end portion in a length direction thereof, and the cells are arranged in at least one of the following arrangement manners: the first end portion is supported by the first side beam, and the second end portion is supported by the middle cross beam; or the second end portion is supported by the first side beam, and the first end portion is supported by the middle cross beam; or the first end portion and the second end portion are respectively supported by two neighboring middle cross beams; or the first end portion is supported by the middle cross beam, and the second end portion is supported by the second side beam; or the second end portion is supported by the middle cross beam, and the first end portion is supported by the second side beam.

In the power battery pack provided in this application, a plurality of cells are directly arranged in a plurality of accommodating chambers in a pack body, removing various mounting structures through which a battery module is mounted in a conventional battery pack, which improves utilization of an internal space of the pack body, and increases a sum of volumes of the cells in the pack body. In other words, a ratio of volumes of the cells to a volume of the pack body is increased, and in a certain volume space, more cells are assembled, improving energy density of the power battery pack. In addition, an assembly process and procedures are simple, thereby reducing manpower, materials, and other costs. Moreover, the assembly procedures are reduced, so that a defective rate is reduced during assembly of the power battery pack, a possibility that the power battery pack becomes loose and is not mounted firmly is reduced, thereby improving quality of the power battery pack and stability and reliability of the battery pack. Two ends of the cell are respectively supported by the first side beam and the second side beam or the middle cross beam. Therefore, the cell itself is used as a load bearing component, to reduce pressure that is applied by the cells to a tray at the bottom of the battery pack or other components. Because the cell itself is used as a load bearing component, and two ends of the cell are supported and function as a supporter, volumes of a module frame and other load-bearing components that are used for fixing the cell may be reduced, thereby increasing the space utilization and improving the energy density.

In some specific embodiments of this application, the middle cross beam is a widthwise cross beam extending along a width direction of the power battery pack, and the cell in the accommodating chamber extends from one side to another side of the accommodating chamber along a length direction of the power battery pack.

In some specific embodiments of this application, the length direction of the cell is arranged along the length direction of the power battery pack, and the plurality of cells are arranged along the width direction of the power battery pack; and only one cell is accommodated in each of the accommodating chambers in the length direction of the power battery pack.

In some specific embodiments of this application, the length direction of the cell is arranged along the length direction of the power battery pack, and the plurality of cells are arranged along the width direction of the power battery pack; and in the length direction of the power battery pack, a shortest distance between an end of the cell and a side wall of an accommodating chamber close to the end is L1, a shortest distance between the other end of the cell and a side wall of the accommodating chamber close to the other end is L2, and the length L0 of the cell meets: $L1+L2<L0$.

In some specific embodiments of this application, the length direction of the cell is arranged along the length direction of the power battery pack, and the plurality of cells are arranged along the width direction of the power battery pack; and at least two layers of cell arrays are included in the pack body along a height direction of the power battery pack.

In some specific embodiments of this application, the first side beam is a first beam, the second side beam is a second beam, both the first beam and the second beam extend along a length direction of the power battery pack, and the middle cross beam is a widthwise cross beam extending along a width direction of the power battery pack;

the pack body includes a third beam and a fourth beam located at two sides of the accommodating space along the length direction of the power battery pack, and both the third beam and the fourth beam extend along the width direction of the power battery pack; and the third beam, the fourth beam, the first beam, and the second beam are fixed together to form a rectangular frame, the rectangular frame and a base plate define the accommodating space, and the third beam and the fourth beam respectively provide inward pressing forces for cells adjacent to the third beam and the fourth beam.

In some specific embodiments of this application, the rectangular frame and the base plate form a vehicle-use tray, and the first beam and the second beam are each provided with a lifting lug extending outward from the accommodating space.

In some specific embodiments of this application, the lifting lug is provided with a mounting hole through which the pack body is mounted on the vehicle.

In some specific embodiments of this application, the middle cross beam is a lengthwise cross beam extending along a length direction of the power battery pack, and the cell in the accommodating chamber extends from one side to another side of the accommodating chamber along a width direction of the power battery pack.

In some specific embodiments of this application, the length direction of the cell is arranged along the width direction of the power battery pack, and the plurality of cells are arranged along the length direction of the power battery pack; and only one cell is accommodated in each of the accommodating chambers in the width direction of the power battery pack.

In some specific embodiments of this application, the length direction of the cell is arranged along the width direction of the power battery pack, and the plurality of cells are arranged along the length direction of the power battery pack; and in the width direction of the power battery pack, a shortest distance between an end of the cell and a side wall of an accommodating chamber close to the end is L3, a shortest distance between the other end of the cell and a side wall of the accommodating chamber close to the other end is L4, and the length L0 of the cell meets: L3+L4<L0.

In some specific embodiments of this application, at least two layers of cell arrays are included in the pack body along a height direction of the power battery pack.

In some specific embodiments of this application, the first side beam is a third beam, the second side beam is a fourth beam, both the third beam and the fourth beam extend along a width direction of the power battery pack, and the middle cross beam is a widthwise cross beam extending along the width direction of the power battery pack.

In some specific embodiments of this application, the pack body includes a first beam and a second beam located at two sides of the accommodating space along the width direction of the power battery pack, both the first beam and the second beam extend along a length direction of the power battery pack, the third beam, the fourth beam, the first beam, and the second beam are fixed together to form a rectangular frame, the rectangular frame and a base plate define the accommodating space, and the first beam and the second beam respectively provide inward pressing forces for cells adjacent to the first beam and the second beam.

In some specific embodiments of this application, the rectangular frame and the base plate form a vehicle-use tray, and the third beam and the fourth beam are each provided with a lifting lug extending outward from the accommodating space.

In some specific embodiments of this application, the lifting lug is provided with a mounting hole through which the pack body is mounted on the vehicle.

In some specific embodiments of this application, a sum V1 of volumes of the plurality of cells and a volume V2 of the power battery pack meet: V1/V2≥55%.

In some specific embodiments of this application, V1/V2≥60%.

In some specific embodiments of this application, a sum V1 of volumes of the plurality of cells and a volume V0 of the accommodating space meet: 81%≤V1/V0≤97%.

In some specific embodiments of this application, the accommodating space has a bottom surface, and a sum S1 of areas of orthographic projections of the plurality of cells on the bottom surface and an area S0 of the bottom surface meet: 72%≤S1/S0≤88%.

In some specific embodiments of this application, a width F of the pack body in the width direction of the power battery pack is 500 mm to 1500 mm.

In some specific embodiments of this application, the power battery pack further includes a battery management system and/or a battery thermal management system.

In some specific embodiments of this application, the pack body is formed on an electric vehicle.

In some specific embodiments of this application, the width direction of the power battery pack is arranged along a width direction of a vehicle body, and the length direction of the power battery pack is arranged along a length direction of the vehicle body; or the width direction of the power battery pack is arranged along the length direction of the vehicle body, and the length direction of the power battery pack is arranged along the width direction of the vehicle body.

In some specific embodiments of this application, the cell includes a cell body, the cell body has a length L, a width H, and a thickness D, the length L of the cell body is greater than the width H, and the width H of the cell body is greater than the thickness D, where the length L and the width H of the cell body meet: L/H=4 to 20.

In some specific embodiments of this application, the cell includes a cell body, and a length L of the cell body and a thickness D of the cell body meet: L/D=23 to 208.

In some specific embodiments of this application, the cell includes a cell body, and a length L of the cell body and a volume V of the cell body meet: L/V=0.00045 $mm^{-2}$ to 0.0015 $mm^{-2}$.

In some specific embodiments of this application, the cell includes a cell body, and a width H of the cell body and a volume V of the cell body meet: H/V=0.0001 $mm^{-2}$ to 0.00015 $mm^{-2}$.

In some specific embodiments of this application, the cell includes a cell body, and a thickness D of the cell body and a volume V of the cell body meet: D/V=0.0000065 $mm^{-2}$ to 0.00002 $mm^{-2}$.

In some specific embodiments of this application, the cell includes a cell body, and a length L of the cell body and a surface area S of the cell body meet: L/S=0.002 $mm^{-2}$ to 0.005 $mm^{-1}$.

In some specific embodiments of this application, the cell includes a cell body, and a surface area S of the cell body and a volume V of the cell body meet: S/V=0.1 $mm^{-1}$ to 0.35 $mm^{1}$.

In some specific embodiments of this application, the cell includes a cell body, and a length L of the cell body is 700 mm to 2500 mm.

In some specific embodiments of this application, the cell is a square battery with an aluminum housing and includes a cell body and an explosion-proof valve, and the explosion-proof valve is disposed on at least one end of the cell body in a length direction of the cell body.

In some specific embodiments of this application, the cell includes a cell body, two ends of the cell body along a length direction of the cell body are each provided with an explosion-proof valve, and the explosion-proof valves at the two ends of the cell body discharge gas through different exhaust channels.

According to an embodiment of a second aspect of this application, an electric vehicle is provided. The electric vehicle includes the power battery pack according to the embodiment of the first aspect of this application.

According to the electric vehicle in the embodiments of this application, the power battery pack according to the embodiment of the first aspect this application is used, which can improve the battery life without expanding the battery occupation space.

According to some specific embodiments of this application, the power battery pack is disposed at the bottom of the electric vehicle, and the pack body is fixedly connected to a chassis of the electric vehicle.

According to some specific examples of this application, the electric vehicle includes one power battery pack disposed at the bottom of the electric vehicle, a width direction of the power battery pack is arranged along a width direction of a vehicle body of the electric vehicle, and a length direction of the power battery pack is arranged along a length direction of the vehicle body of the electric vehicle.

A width F of the pack body and a width W of the vehicle body meet: 50%≤F/W≤80%.

The cell includes a cell body, and a length L of the cell body in the width direction of the power battery pack and the width W of the vehicle body meet: 46%≤L/W≤76%.

According to some specific examples of this application, the width W of the vehicle body is 500 mm to 2000 mm.

Other aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description of the embodiments made with reference to the following accompanying drawings.

REFERENCE NUMERALS

Figure 1:
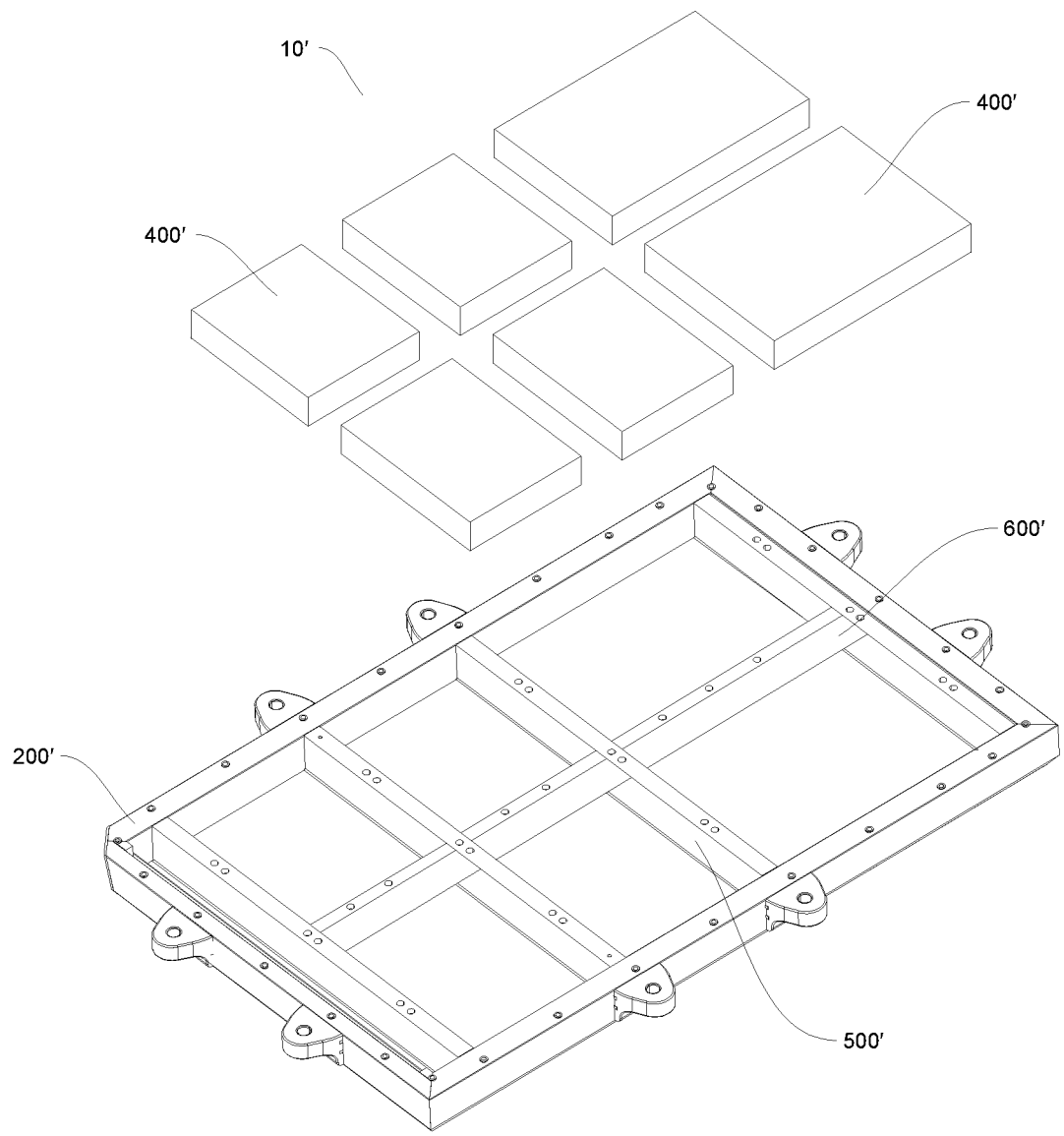
FIG. 1 is an exploded view of a power battery pack provided in the related art.

In the related art:
Power battery pack 10', pack body 200", battery module 400', lengthwise cross beam 600', and widthwise cross beam 500';

In this application:
Electric vehicle 1,
power battery pack 10,
cell 100, cell body 110, pack body 200, tray 210, upper cover 220, first beam 201, second beam 202, third beam 203, fourth beam 204, exhaust channel 222, air inlet 221,
cell array 400,
first terminal 101, second terminal 102, explosion-proof valve 103,
lengthwise cross beam 600, and widthwise cross beam 500,
length direction A of power battery pack 10, width direction B of power battery pack 10, height direction C of power battery pack 10,
length L of cell body 110, width H of cell body 110, thickness D of cell body 110, width W of vehicle body, and width F of pack body 200.

DETAILED DESCRIPTION

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

In the description of this application, it should be understood that orientation or position relationships indicated by the terms such as "vertical", "transverse", "length", "width", "thickness", "inside", and "outside" are based on orientation or position relationships shown in the accompanying drawings, and are used only for ease and brevity of illustration and description, rather than indicating or implying that the mentioned apparatus or element needs to have a particular orientation or needs to be constructed and operated in a particular orientation. Therefore, such terms should not be construed as limiting of this application.

In addition, in the description of this application, "a plurality of means two or more than two.

In the related art, as shown in FIG. 1, a pack body 200" of a power battery pack 10' is mostly divided into mounting areas of a plurality of battery modules 400' by a widthwise cross beam 500' and a lengthwise cross beam 600'. For example, the battery module 400' of a battery pack disclosed in CN107925028A is fixed to the widthwise cross beam 500' and the lengthwise cross beam 600' by using screws or in another manner. The battery module 400' includes a plurality of cells arranged in sequence, the plurality of cells is arranged to form a cell array, and an end plate and/or side plate is disposed outside the cell array. Generally, the end plate and the side plate are included simultaneously and are fixed to enclose a space for accommodating the cell array. In addition, the end plate and the side plate are connected by using screws, or connected by using another connecting member such as a pull rod, to fix the cell array.

It is found through experiments and analysis that the battery module 400' is fixed to the widthwise cross beam 500' or the lengthwise cross beam 600' by using screws or another structure, which wastes a space, and increases weight because of addition of screws or another connecting member. In addition, the battery module 400' is designed through fitting of the end plate and the side plate. Both the end plate and the side plate have certain thicknesses and heights, wasting a space inside the pack body 200" and reducing volume utilization of the pack body 200". Generally, for the power battery pack 10' in the related art, a ratio of a sum of volumes of cells in the pack body 200" to a volume of the pack body 200" is about 50% or even lower to 40%.

By using the power battery pack 10' provided in the embodiments in the related art, the end plate and the side plate of the battery module 400', a connection manner and a mounting manner inside the power battery pack 10', and the like reduce utilization of an internal space of the pack body 200". Accordingly, in the power battery pack 10', a ratio of the sum of volumes of the cells to the volume of the pack body 200" is excessively low, and energy density of the power battery pack cannot meet the demand of users for battery life of electric vehicles, which has gradually become an important factor hindering the development of the electric vehicles. In addition, an assembly process is cumbersome, and assembly procedures are complicated. First, the cells need to be assembled into a battery module and then the battery module is mounted in the pack body, increasing manpower, materials, and other costs. In addition, because a plurality of assembly procedures are needed, a probability of a defective rate is increased during assembly of the power battery pack. A plurality of assembly procedures increase a possibility that the power battery pack becomes loose and is not mounted firmly, causing an adverse effect on quality of the power battery pack, reducing stability and reliability of the power battery pack.

Considering a current situation of the power battery pack in the related art, this application provides a power battery pack and an electric vehicle having the power battery pack. The power battery pack has advantages of high space utilization, large energy density, and long battery life.

The power battery pack 10 according to an embodiment of this application is described below with reference to the accompanying drawings. A length direction of the power battery pack 10 is indicated by using an arrow A, a width direction of the power battery pack 10 is indicated by using an arrow B.

Figure 13:
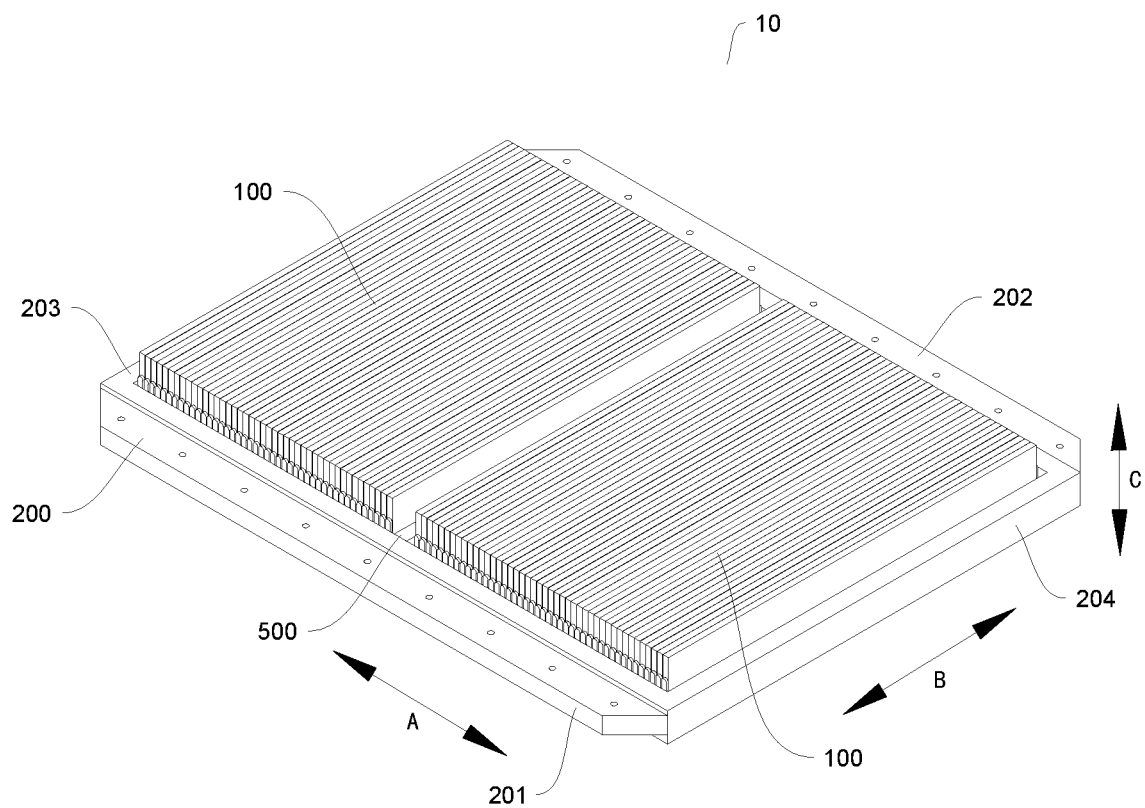
FIG. 13 is a three-dimensional diagram of a power battery pack according to a second optional embodiment of this application.
Figure 14:
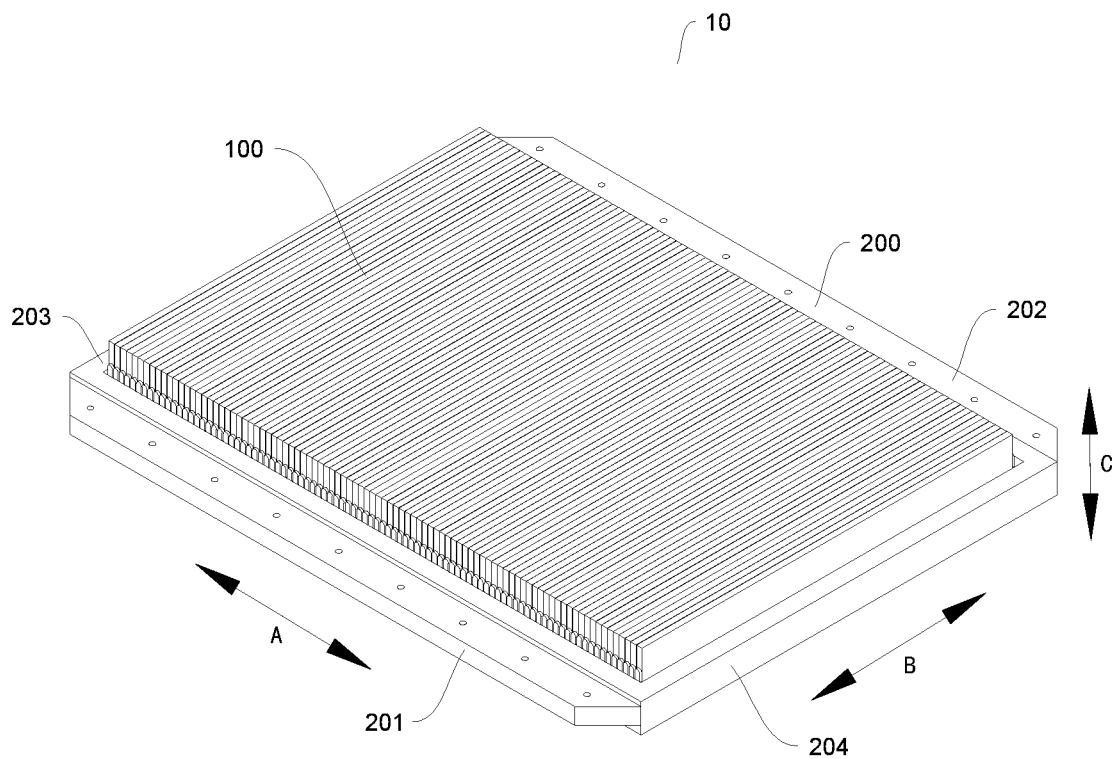
FIG. 14 is a three-dimensional diagram of a power battery pack according to a third optional embodiment of this application.
Figure 15:
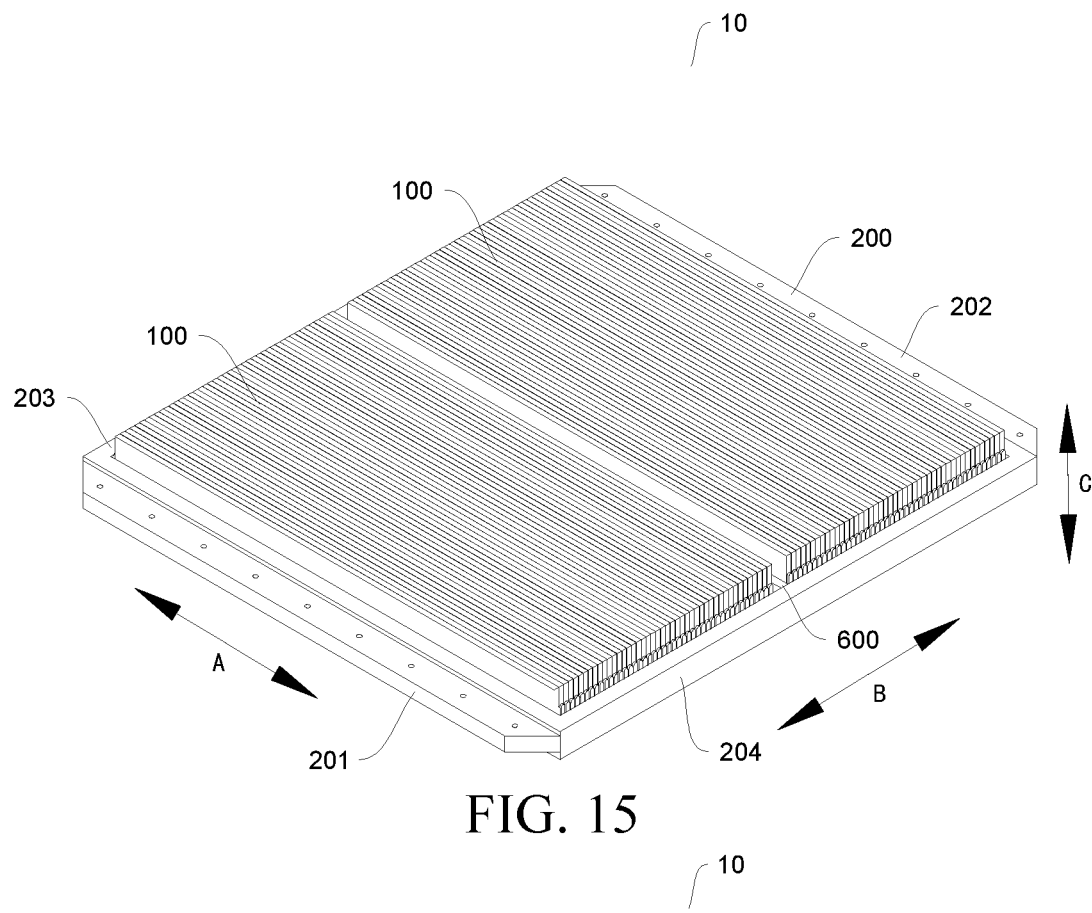
FIG. 15 is a three-dimensional diagram of a power battery pack according to a fourth optional embodiment of this application.

As shown in FIG. 13 to FIG. 15, the power battery pack 10 according to this embodiment of this application includes a pack body 200 and a plurality of cells 100.

An accommodating space is defined in the pack body 200, the pack body 200 is provided therein with at least one middle cross beam, and the accommodating space is divided into at least two accommodating chambers by the at least one middle cross beam. The plurality of cells 100 are disposed in the pack body 200 and arranged in the accommodating chambers. At least one cell 100 is arranged in each accommodating chamber to form a cell array.

The pack body 200 includes a first side beam and a second side beam disposed opposite to each other at two sides of the accommodating space, the cell 100 has a first end portion and a second end portion in a length direction thereof, and the cells 100 are arranged in at least one of the following arrangement manners:

the first end portion is supported by the first side beam, and the second end portion is supported by the middle cross beam; or the second end portion is supported by the first side beam, and the first end portion is supported by the middle cross beam; or the first end portion and the second end portion are respectively supported by two neighboring middle cross beams; or the first end portion is supported by the middle cross beam, and the second end portion is supported by the second side beam; or the second end portion is supported by the middle cross beam, and the first end portion is supported by the second side beam.

Referring to FIG. 13, in a specific embodiment of this application, the middle cross beam is a widthwise cross beam 500 extending along a width direction of the power battery pack.

Referring to FIG. 15, in another specific embodiment of this application, the middle cross beam is a lengthwise cross beam 600 extending along a length direction of the power battery pack.

For the widthwise cross beam 500 or the lengthwise cross beam 600, the widthwise cross beam 500 extends along the width direction B of the power battery pack 10, and the lengthwise cross beam 600 extends along the length direction A of the power battery pack. The accommodating space is divided into a plurality of accommodating chambers by the widthwise cross beam 500 or the lengthwise cross beam 600. The plurality of cells 100 are disposed in the pack body 200 and directly arranged in the plurality of accommodating chambers, and at least one cell 100 is arranged in each accommodating chamber to form a cell array.

For example, as shown in FIG. 13 and FIG. 15, the pack body 200 is provided therein with one of the widthwise cross beam 500 and the lengthwise cross beam 600. The widthwise cross beam 500 extends along the width direction B of the power battery pack 10, and in the pack body 200, the widthwise cross beam 500 divides the accommodating space into a plurality of accommodating chambers along the length direction A of the power battery pack. As shown in FIG. 13, the widthwise cross beam 500 divides the accommodating space into two accommodating chambers, and one cell array is correspondingly arranged in each of the accommodating chambers. The lengthwise cross beam 600 extends along the length direction A of the power battery pack 10, and in the pack body 200, the lengthwise cross beam 600 divides the accommodating space into a plurality of accommodating chambers along the width direction B of the power battery pack. As shown in FIG. 15, the lengthwise cross beam 600 divides the accommodating space into two accommodating chambers, and one cell array is correspondingly arranged in each accommodating chamber. The plurality of cells 100 are directly arranged in the plurality of accommodating chambers, and at least one cell 100 is arranged in each accommodating chamber to form a cell array.

It needs to be understood herein that the "directly" in the "directly arranged" refers to that several cells 100 in the accommodating chambers are not assembled into battery modules in advance before mounted in the accommodating chambers. During the assembly, the several cells 100 are directly placed in the accommodating chambers, to implement mounting. For example, the end plate, the side plate, and other structures are not disposed in a cell array formed by cells 100 (for example, in the structure shown in FIG. 1, a battery module is first formed by cells, and then put into the pack body).

In the power battery pack 10 provided in this application, a plurality of cells 100 are directly arranged in a plurality of accommodating chambers in a pack body, reducing various mounting structures through which a battery module is mounted in a conventional battery pack, which improves utilization of an internal space of the pack body 200, and increases a sum of volumes of the cells 100 in the pack body 200. In other words, a ratio of volumes of the cells 100 to a volume of the pack body 200 is increased, and in a certain volume space, more cells 100 are assembled, improving energy density of the power battery pack 10. In addition, an assembly process and procedures are simple, thereby reducing manpower, materials, and other costs. Moreover, the assembly procedures are reduced, so that a defective rate is reduced during assembly of the power battery pack 10, a possibility that the power battery pack becomes loose and is not mounted firmly is reduced, thereby improving quality of the power battery pack and stability and reliability of the battery pack.

In a specific embodiment of this application, the pack body 200 is provided therein with at least one widthwise cross beam 500, the cells 100 extend along the length direction A of the power battery pack 10, and are arranged along the width direction B of the power battery pack 10. That is, the cell 100 in the accommodating chamber extends from one side to another side of the accommodating chamber along the length direction A of the power battery pack 10. End portions of the cell 100 in a length direction of the cell are supported by both the pack body 200 and the widthwise cross beam 500.

In the length direction A of the power battery pack 10, a total distance between the cell 100 and two neighboring end walls of the pack body 200 is less than a length of the cell 100. Specifically, in the length direction A of the power battery pack 10, a shortest distance between an end of the cell 100 and a side wall of an accommodating chamber close to the end of the cell 100 is L1, a shortest distance between the other end of the cell 100 and a side wall of the accommodating chamber close to the other end of the cell 100 is L2, and the length L0 of the cell 100 meets: L1+L2<L0. In this way, another additional cell 100 cannot be accommodated in the length direction A of the power battery pack 10.

In other words, in the pack body 200, only one cell 100 is accommodated in each of the accommodating chambers in the length direction A of the power battery pack 10. That is, in the length direction A of the power battery pack 10, two or more cells 100 cannot be arranged in the same accommodating chamber.

In a specific embodiment of this application, the first side beam and the second side beam are respectively a first beam and a second beam at two sides of the pack body 200 in the width direction B of the power battery pack 10, and the first beam and the second beam extend along the length direction of the power battery pack 10. In a specific embodiment of this application, the first side beam and the second side beam are respectively a third beam and a fourth beam at two ends of the pack body 200 in the length direction A of the power battery pack 10, and both the third beam and the fourth beam extend along the width direction of the power battery pack 10. The first beam 201, the second beam 202, the third beam 203, and the fourth beam 204 may be a separator, an insulating member, a heat dissipation component, or a protection partition plate.

At least two layers of cell arrays are included in the pack body 200 along a height direction C of the power battery pack 10. Therefore, a quantity of the cells 100 is optimized, so that the space utilization is improved, to improve the energy density, and BIC and low-voltage sampling are easier to be integrated.

In some specific examples of this application, the pack body 200 includes a third beam and a fourth beam located at two ends in the length direction A of the power battery pack 10, and the end portions of the cell 100 in the length direction of the cell are supported by the third beam and the fourth beam. The pack body 200 includes a first beam and a second beam located at two sides in the width direction B of the power battery pack 10, and the first beam and the second beam provide inward pressing forces for cells 100 adjacent to thereof.

As shown in FIG. 15, the pack body 200 includes a first beam 201, a second beam 202, a third beam 203, and a fourth beam 204. The first beam 201, the second beam 202, the third beam 203, and the fourth beam 204 are fixed together to form a rectangular frame, and the rectangular frame and a base plate define the accommodating space. The first beam 201 is opposite to the second beam 202 in the width direction B of the power battery pack 10, and the third beam 203 is opposite to the fourth beam 204 in the length direction A of the power battery pack 10. The third beam 203 and the fourth beam 204 provide supporting forces for the end portions of the cell 100 in the length direction of the cell. The first beam 201 and the second beam 202 provide pressing forces for two sides of the cell 100 in a thickness direction of the cell. That is, the first beam 201 applies a force, facing the second beam 202, to cells 100 disposed adjacent to the first beam 201, and the second beam 202 applies a force, facing the first beam 201, to cells 100 disposed adjacent to the second beam 202, so that a plurality of cells 100 can be closely arranged between the first beam 201 and the second beam 202 along the width direction B of the power battery pack 10, and the plurality of cells 100 can be attached to each other. In addition, the first beam 201 and the second beam 202 may limit the plurality of cells 100 in the width direction B of the power battery pack 10. In particular, when the cells 100 slightly swell, the cells 100 can be buffered and provided with an inward pressure to prevent the cells 100 from swelling and deforming excessively.

The cell 100 has a first end portion and a second end portion in a length direction thereof, and the cells 100 are arranged in at least one of the following arrangement manners:

the first end portion of the cell 100 is supported by the third beam 203, and the second end portion of the cell 100 is supported by the widthwise cross beam 500;

the second end portion of the cell 100 is supported by the third beam 203, and the first end portion of the cell 100 is supported by the widthwise cross beam 500;

the first end portion and the second end portion of the cell 100 are respectively supported by two neighboring widthwise cross beams 500;

the first end portion of the cell 100 is supported by the widthwise cross beam 500, and the second end portion of the cell 100 is supported by the fourth beam 204; or the second end portion of the cell 100 is supported by the widthwise cross beam 500, and the first end portion of the cell 100 is supported by the fourth beam 204.

In some specific examples of this application, the rectangular frame and the base plate form a vehicle-use tray, the third beam 203 and the fourth beam 204 are each provided with a lifting lug through which the power battery pack is mounted on a vehicle, and the lifting lug is provided with a mounting hole through which the pack body 200 can be mounted on the vehicle.

In a specific embodiment of this application, the pack body 200 is provided therein with at least one lengthwise cross beam 600, the cells 100 extend along the width direction B of the power battery pack 10, and are arranged along the Length direction A of the power battery pack 10. That is, the cell 100 in the accommodating chamber extends from one side to another side of the accommodating chamber along the width direction B of the power battery pack 10. End portions of the cell 100 in a length direction of the cell are supported by both the pack body 200 and the lengthwise cross beam 600.

In the width direction B of the power battery pack 10, a total distance between the cell 100 and two neighboring side walls of the pack body 200 is less than the length of the cell 100. Specifically, in the width direction B of the power battery pack 10, a shortest distance between an end of the cell 100 and a side wall of an accommodating chamber close to the end of the cell 100 is L3, a shortest distance between the other end of the cell 100 and a side wall of the accommodating chamber close to the other end of the cell 100 is L4, and the length L0 of the cell 100 meets: L3+L4<L0. In this way, another additional cell 100 cannot be accommodated in the accommodating chamber in the width direction B of the power battery pack 10.

In other words, in the pack body 200, only one cell 100 is accommodated in each of the accommodating chambers in the width direction B of the power battery pack 10. That is, in the width direction B of the power battery pack 10, two or more cells 100 cannot be arranged in the same accommodating chamber.

It may be understood that the two sides of the pack body 200 are the first beam and the second beam in the width direction B of the power battery pack 10, and the two ends of the pack body 200 are the third beam and the fourth beam in the length direction A of the power battery pack 10. The first beam 201, the second beam 202, the third beam 203, and the fourth beam 204 may be a separator, an insulating member, a heat dissipation component, or a protection partition plate.

At least two layers of cell arrays are included in the pack body 200 along a height direction C of the power battery pack 10. Therefore, a quantity of the cells 100 is optimized, so that the space utilization is improved, to improve the energy density, and BIC and low-voltage sampling are easier to be integrated.

In some specific examples of this application, the pack body 200 includes a first beam and a second beam located at two sides in the width direction B of the power battery pack 10, and end portions of the cell 100 in the length direction of the cell are supported by the first beam and the second beam. The pack body 200 includes a third beam and a fourth beam located at two ends in the length direction A of the power battery pack 10, and the third beam and the fourth beam provide inward pressing forces for cells 100 adjacent to the third beam and the fourth beam.

As shown in FIG. 13, the pack body 200 includes a first beam 201, a second beam 202, a third beam 203, and a fourth beam 204. The first beam 201, the second beam 202, the third beam 203, and the fourth beam 204 are fixed together to form a rectangular frame, and the rectangular frame and a base plate define the accommodating space. The first beam 201 is opposite to the second beam 202 in the width direction B of the power battery pack 10, and the third beam 203 is opposite to the fourth beam 204 in the length direction A of the power battery pack 10. The first beam 201 and the second beam 202 provide supporting forces for the end portions of the cell 100 in the length direction of the cell. The third beam 203 and the fourth beam 204 provide pressing forces for two sides of the cell 100 in a thickness direction of the cell. That is, the third beam 203 applies a force, facing the fourth beam 204, to cells 100 disposed adjacent to the third beam 203, and the fourth beam 204 applies a force, facing the third beam 203, to cells 100 disposed adjacent to the fourth beam 204, so that a plurality of cells 100 can be closely arranged between the third beam 203 and the fourth beam 204 along the length direction A of the power battery pack 10, and the plurality of cells 100 can be attached to each other. In addition, the third beam 203 and the fourth beam 204 may limit the plurality of cells 100 in the length direction A of the power battery pack 10. In particular, when the cells 100 slightly swell, the cells 100 can be buffered and provided with an inward pressure to prevent the cells 100 from swelling and deforming excessively.

The cell 100 has a first end portion and a second end portion in a length direction thereof, and the cells 100 are arranged in at least one of the following arrangement manners:

the first end portion of the cell 100 is supported by the first beam 201, and the second end portion of the cell 100 is supported by the lengthwise cross beam 600; or the second end portion of the cell 100 is supported by the first beam 201, and the first end portion of the cell 100 is supported by the lengthwise cross beam 600; or the first end portion and the second end portion of the cell 100 are respectively supported by two neighboring lengthwise cross beams 600; or the first end portion of the cell 100 is supported by the lengthwise cross beam 600, and the second end portion of the cell 100 is supported by the second beam 202; or the second end portion of the cell 100 is supported by the lengthwise cross beam 600, and the first end portion of the cell 100 is supported by the second beam 202.

In some specific examples of this application, the rectangular frame and the base plate form a vehicle-use tray, the first beam 201 and the second beam 202 are each provided with a lifting lug extending outward from the accommodating space, and the lifting lug is provided with a mounting hole through which the pack body 200 can be mounted on the vehicle.

The power battery pack 10 according to an embodiment of this application is described below with reference to the accompanying drawings.

As shown in FIG. 2 to FIG. 16, the power battery pack 10 according to this embodiment of this application includes a pack body 200 and a plurality of cells 100.

In some embodiments, the pack body 200 may include a tray 210 and an upper cover 220. The tray 210 and the upper cover 220 jointly define an accommodating space for the plurality of cells 100. The plurality of cells 100 are disposed on the tray 210, and are covered by using the upper cover 220. In this embodiment, the tray 210 may be a box with an upper opening, and the upper cover 220 is in a flat plate shape, and is configured to seal the upper opening of the tray 210. In a common industrial solution, the tray 210 is a box with an upper opening, and the upper cover 220 is a box with a lower opening opposite to the tray. The upper opening of the tray 210 corresponds to the lower opening of the upper cover 220. During assembly, the upper opening of the tray aligns with the lower opening of the upper cover, to implement package of an internal accommodating space.

In some special embodiments, for example, when an overall waterproof performance of the cell is relatively good, or the pack body is directly formed on the electric vehicle, the upper cover may not need to be disposed, and a cell array formed by several cells is supported only by using one tray. Even, in some embodiments, there is no need to provide a side beam or side edge on the periphery of the pack body, and the pack body is more like a flat plate without side edges. The cells are directly disposed on the flat plate. Alternatively, a cross beam is disposed on the flat plate, and then the cells are fixed by using the cross beam. More figuratively, the pack body may be imagined as a support that supports cells and through which a cell array formed by the cells is mounted on the electric vehicle, and there is no need to define the pack body as a complete pack body.

In some specific embodiments of this application, as shown in FIG. 2 to FIG. 16, the power battery pack 10 according to the embodiments of this application includes a pack body 200 and a plurality of cells 100.

The plurality of cells 100 are disposed in the pack body 200. The pack body 200 may be understood as a housing configured to accommodating the plurality of cells 100. The structure of the pack body 200 may include a tray 210 and an upper cover 220. The tray 210 and the upper cover 220 jointly define an accommodating space for the plurality of cells 100. The plurality of cells 100 are disposed on the tray 210, and are covered by using the upper cover 220. That is, the plurality of cells 100 are disposed in the accommodating space. A sum V1 of volumes of the plurality of cells 100 and a volume V0 of the accommodating space meet: $81\% \leq V1/V0 \leq 97\%$.

A person skilled in the art may understand that, V1 is a product of volumes of the cells 100 and a quantity of the cells 100, that is, V1 is a total volume of the plurality of cells 100, and V0 is an actually remaining volume that is obtained by subtracting volumes of housings such as a tray base plate, four side edges on the periphery of the tray base plate, and the upper cover and a volume occupied by an internal battery management system and other power distribution modules from a total volume of the pack body 200 and that can accommodate the cells 100 and the widthwise cross beam 500 or the lengthwise cross beam 600. That is, V0 is a volume of a space that is provided in the pack body 200 for accommodating the cells 100 and the widthwise cross beam 500 or the lengthwise cross beam 600.

According to the power battery pack 10 in the embodiments of this application, a proportion of a sum of volumes of the cells 100 to a volume of the accommodating space is defined, that is, $81\% \leq V1/V0 \leq 97\%$, so that the space utilization of the power battery pack 10 may be improved, and more cells 100 may be arranged in the power battery pack 10, that is, more energy providing structures are arranged in a unit space. Therefore, the energy density may be improved, thereby improving the battery life without expanding an occupation space.

In some specific embodiments of this application, as shown in FIG. 2 to FIG. 16, the power battery pack 10 according to the embodiments of this application includes a pack body 200 and a plurality of cells 100.

The plurality of cells 100 are disposed in the pack body 200. The pack body 200 may be understood as a housing configured to accommodating the plurality of cells 100, for example, may include a tray 210 and an upper cover 220. The tray 210 and the upper cover 220 jointly define an accommodating space for the plurality of cells 100. The plurality of cells 100 are disposed on the tray 210, and are covered by using the upper cover 220, that is, disposed in the accommodating space. The accommodating space has a bottom surface, and the bottom surface is defined as a part of a bottom wall of the accommodating space. A sum S1 of areas of orthographic projections of the plurality of cells 100 on the bottom surface and an area S0 of the bottom surface meet: $72\% \leq S1/S0 \leq 88\%$.

A person skilled in the art may understand that, S1 is a product of areas of orthographic projections of the cells 100 on the ground and a quantity of the cells 100, and S0 is an area of the bottom surface. It needs to be understood that the area of the bottom surface herein is an overall flat area of the bottom surface, and does not include surface areas of some concave-convex structures. In other words, it may be understood as an area of an orthographic projection of the bottom surface on the horizontal plane.

According to the power battery pack 10 in the embodiments of this application, a proportion of a sum of areas of orthographic projections of the cells 100 on the bottom surface to an area of the bottom surface is defined, that is, $72\% \leq S1/S0 \leq 88\%$, so that the space utilization of the power battery pack 10 may be improved, and more cells 100 may be arranged in the power battery pack 10, that is, more energy providing structures are arranged in a unit space. Therefore, the energy density may be improved, thereby improving the battery life without expanding an occupation space.

In some specific examples of this application, a sum V1 of volumes of the plurality of cells 100 and a volume V2 of the power battery pack 10 meet: $V1/V2 \geq 55\%$.

A person skilled in the art may understand that, V1 is a product of volumes of the cells 100 and a quantity of the cells 100, and V2 is an overall volume of a three-dimensional shape defined by an outer contour of the power battery pack 10, that is, a volume including an internal space of the power battery pack 10, that is, a volume of a three-dimensional region enclosed by the outer contour of the power battery pack 10 in space. V1/V2 may be defined as space utilization.

According to the power battery pack 10 in the embodiments of this application, a proportion of a sum of volumes of the cells 100 to a volume of the power battery pack 10 is defined, that is, $V1/V2 \geq 55\%$, so that the space utilization of the power battery pack 10 may be improved, and more cells 100 may be arranged in the power battery pack 10, that is, more energy providing structures are arranged in a unit space. Therefore, the energy density may be improved, thereby improving the battery life without expanding an occupation space.

In some embodiments of this application, a proportion of a sum V1 of volumes of the plurality of cells 100 to a volume V2 of the power battery pack 10 meets: V1/V2≥60%. In some other embodiments of this application, a proportion of the sum of the volumes of the plurality of cells 100 to the volume of the power battery pack 10 meets: V1/V2≥62%. In some other embodiments of this application, a proportion of the sum of the volumes of the plurality of cells 100 to the volume of the power battery pack 10 meets: V1/V2≥65%.

A person skilled in the art may understand that, due to the influence of some factors, for example, peripheral parts and components, including a ball-strike preventing space at the bottom of the tray, a liquid cooling system, a thermal insulation material, an insulation protector, a thermal security accessory, a fire and gas discharge channel, and a high-voltage power distribution module, occupy the internal space of the pack body 200, a peak value of V1/V2 is usually 80%, that is, V1/V2≤80%.

The power battery pack 10 according to a specific embodiment of this application is described below with reference to the accompanying drawings. A length direction of the power battery pack 10 is indicated by using an arrow A, a width direction of the power battery pack 10 is indicated by using an arrow B, and a height direction of the power battery pack 10 is indicated by using an arrow C.

In some specific embodiments of this application, as shown in FIG. 13, a length direction of the cell 100 is arranged along the width direction B of the power battery pack 10, and the plurality of cells 100 are arranged along the length direction A of the power battery pack 10, facilitating in setting the space utilization of the power battery pack 10 to 55%, 60%, 62%, 65%, or a higher value.

In some specific embodiments of this application, as shown in FIG. 15, a length direction of the cell 100 is arranged along the length direction A of the power battery pack 10, and the plurality of cells 100 are arranged along the width direction B of the power battery pack 10, facilitating in setting the space utilization of the power battery pack 10 to 50%, 60%, 62%, 65%, or a higher value.

Figure 6:
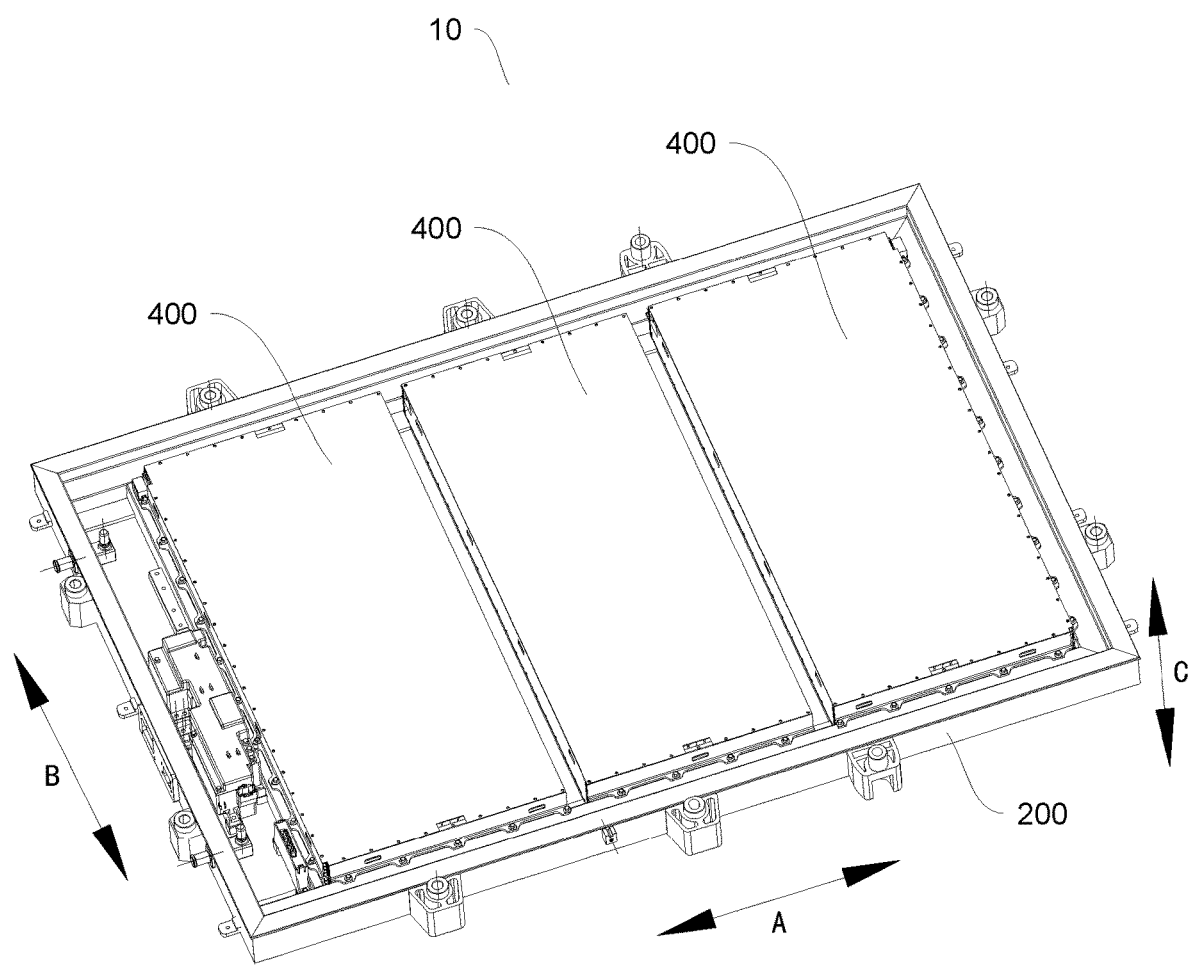
FIG. 6 is a schematic diagram of an arrangement manner of cell arrays of a power battery pack according to an embodiment of this application.
Figure 7:
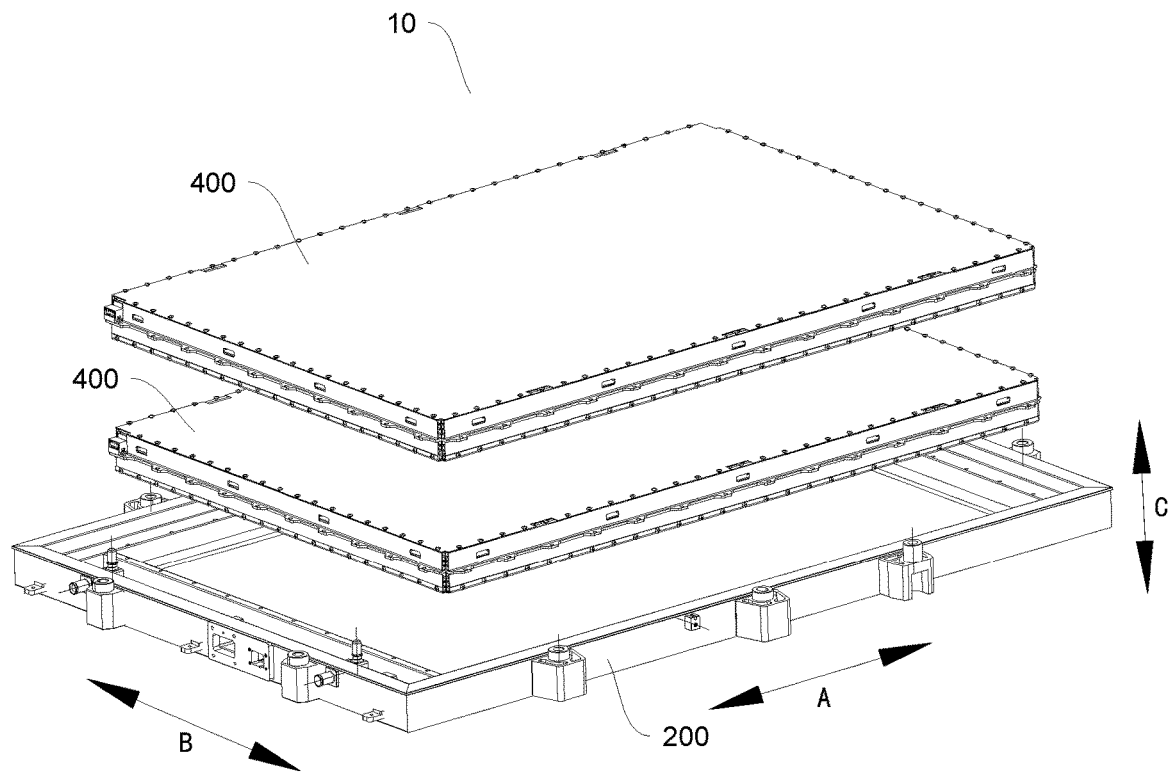
FIG. 7 is a schematic diagram of an arrangement manner of cell arrays of a power battery pack according to another embodiment of this application.

In some specific embodiments of this application, the plurality of cells 100 may be assembled into a plurality of cell arrays 400. The plurality of cell arrays 400 may be arranged along the length direction A of the power battery pack 10 (as shown in FIG. 6). Alternatively, the plurality of cell arrays 400 may be arranged along the width direction B of the power battery pack 10 (as shown in FIG. 15). Alternatively, the plurality of cell arrays 400 may be arranged along the height direction C of the power battery pack 10 to form a multi-layer structure (as shown in FIG. 7). In other words, regardless of whether the cell 100 extends along the width direction B or the length direction A of the power battery pack 10, the plurality of cells 100 may be arranged along the height direction C of the power battery pack 10 into multi layers. The plurality of cell arrays 400 may be alternatively arranged along the length direction A and the height direction C of the power battery pack 10 simultaneously, or may be arranged along the width direction B and the height direction C of the power battery pack 10 simultaneously. Therefore, a quantity of the cell arrays 400 is optimized, so that the space utilization is improved, to improve the energy density, and BIC and low-voltage sampling are easier to be integrated. It needs to be understood that, end plates, side plates, or other structures are not disposed for the cell arrays 400 in the embodiments of this application.

In the related art, because the cell has a relatively small size and a relatively short length, two opposite ends of the cell cannot fit two side walls disposed opposite to each other in the pack body 200″. Therefore, a lengthwise cross beam 600′ and a widthwise cross beam 500′ (as shown in FIG. 1) need to be disposed in the pack body 200″, to facilitate assembly of the cell.

Because in the related art, the pack body 200″ is provided therein with the lengthwise cross beam 600′ and the widthwise cross beam 500′, the lengthwise cross beam 600′ and the widthwise cross beam 500′ occupy a large mounting space for accommodating cells in the pack body 200″, resulting in relatively low space utilization of the pack body 200″. Generally, a ratio of a sum of volumes of the cells to a volume of the pack body 200″ is about 40% or even lower. In other words, in the related art, only about 40% of the space in the pack body 200″ may be used for mounting the cells, resulting in a limited quantity of cells to be accommodated in the pack body 200″, limiting a capacity and voltage of the entire power battery pack 10′, and causing poor battery life of the power battery pack 10′.

According to the power battery pack 10 in the embodiments of this application, on one hand, the use of the lengthwise cross beam and the widthwise cross beam in the pack body 200 can be reduced, thereby reducing a space occupied by the lengthwise cross beam and/or the widthwise cross beam in the pack body 200, and improving the space utilization of the pack body 200; on the other hand, the use of the end plate and the side plate in the cell array 400 can be reduced, thereby reducing a space occupied by the end plate and the side plate in the pack body 200, and improving the space utilization of the pack body 200. More cells 100 can be arranged in the pack body 200, thereby improving the capacity, voltage, and battery life of the entire power battery pack.

In addition, because the use of the lengthwise cross beam and the widthwise cross beam is reduced in the pack body 200, on one hand, a manufacturing process of the pack body 200 is simplified, the assembly complexity of the cell 100 is reduced, and production costs are reduced; on the other hand, the weights of the pack body 200 and the entire power battery pack 10 are reduced, lightweight of the power battery pack 10 is achieved. In particular, when the power battery pack 10 is mounted on an electric vehicle, the battery life of the electric vehicle may be further improved, and lightweight of the electric vehicle is achieved.

In some specific examples of this application, the cell 100 includes a cell body 110 (which may be understood as a body portion in addition to small-sized protrusion structures such as an electrode tab). A volume V of the cell body 110 and energy E of the cell body 110 meet: V/E≤2000 $mm^3 \cdot Wh^{-1}$. Therefore, not only a sufficient heat dissipation area is ensured, to ensure a heat dissipation effect, but also a volume proportion of the cells 100 may be reduced, facilitating compact arrangement of the plurality of cells 100 in the power battery pack 10.

Figure 9:
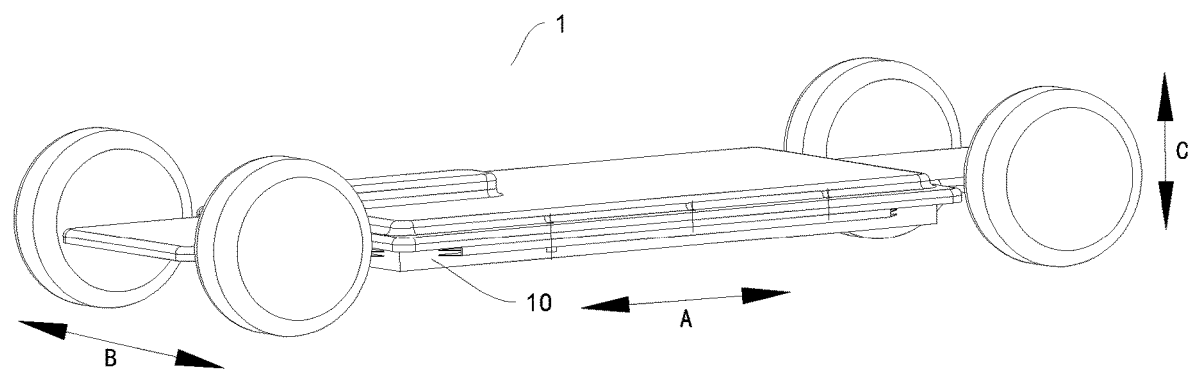
FIG. 9 is a schematic structural diagram of an electric vehicle according to an embodiment of this application.
Figure 10:
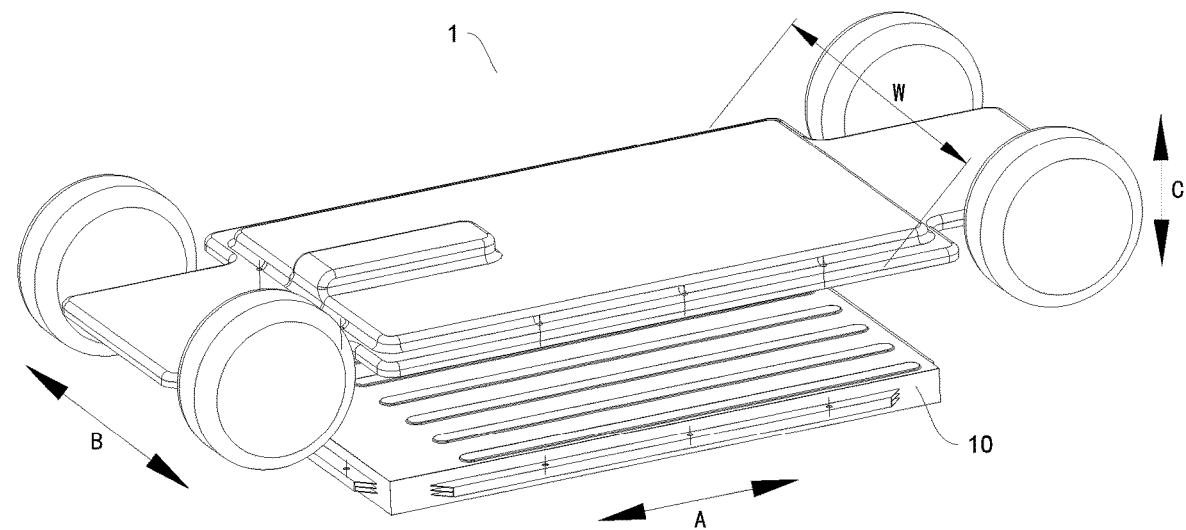
FIG. 10 is an exploded view of an electric vehicle according to an embodiment of this application.

In some specific embodiments of this application, as shown in FIG. 9 and FIG. 10, the pack body 200 is different from a battery pack housing disclosed in the Chinese patent No. CN107925028A, in particular, in terms of a size and load bearing. The pack body 200 may include a vehicle-use tray 210 connected to a vehicle body in a fitting manner, to form a structure that fit the vehicle or the vehicle body and that accommodates and carries the cells 100. The vehicle-use tray 210 is a tray that is separately produced and used for accommodating and mounting of the cells 100. When the cells 100 are mounted on the vehicle-use tray 210, the vehicle-use tray 210 may be mounted on the vehicle body through a fastener, for example, hanging on the chassis of the electric vehicle for accommodating and load bearing.

When the power battery pack 10 is used in a vehicle for providing electric energy, the length direction of the cell 100 may be arranged along a width direction of the vehicle body, that is, a left-right direction of the vehicle. In this case, a length L of the cell body 110 of the cell 100 may be 700 mm to 2500 mm. In some other embodiments of this application, the length L of the cell body 110 of the cell 100 may be 700 mm to 1500 mm, to enable the length of the cell 100 to fit a width of the vehicle.

In each accommodating chamber, the cells 100 may be disposed perpendicular to an inner side wall of the accommodating chamber, or may be disposed in a tilted manner.

Figure 8:
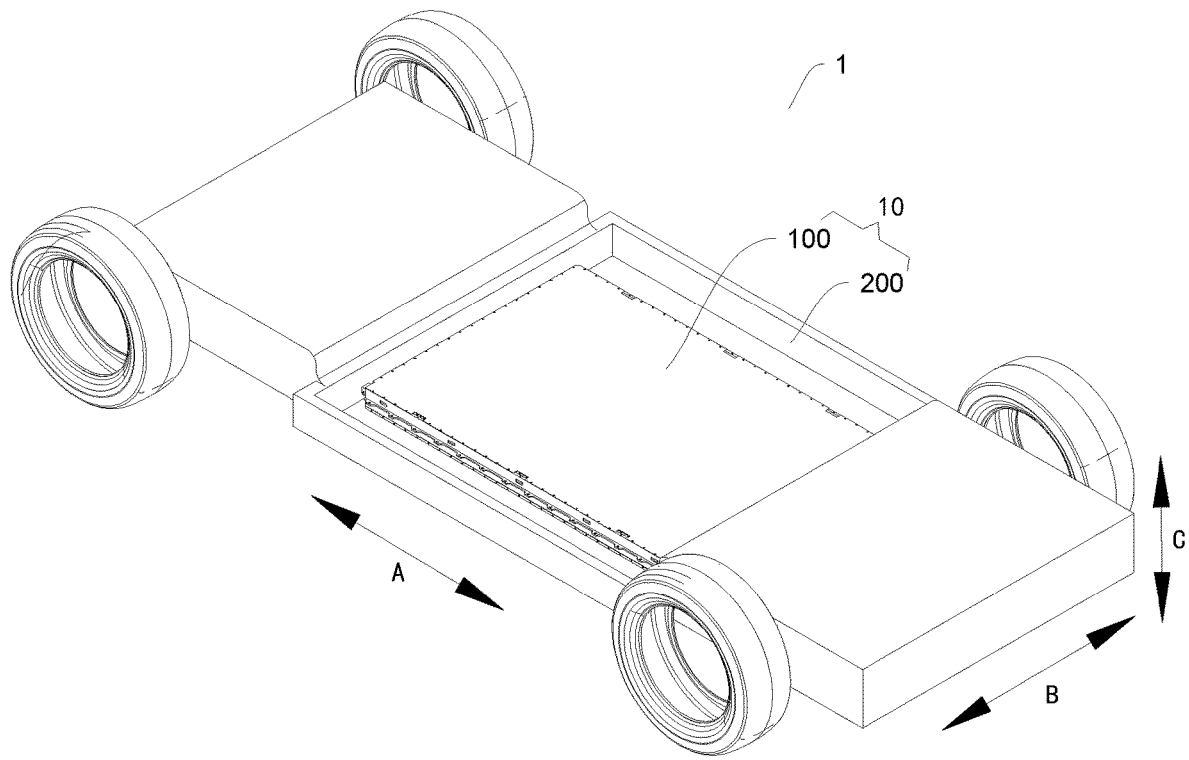
FIG. 8 is a schematic structural diagram of a pack body of a power battery pack being formed on an electric vehicle according to an embodiment of this application.

In some specific examples of this application, as shown in FIG. 8, the pack body 200 may be alternatively directly formed on the electric vehicle. In other words, the pack body 200 is a device that is formed at any appropriate position on the electric vehicle and in which the cell 100 is mounted. For example, the pack body 200 may be formed on the chassis of the electric vehicle.

In some specific embodiments of this application, when the power battery pack 10 is arranged on the electric vehicle, different from the battery pack disclosed in the Chinese patent No. CN107925028A, the power battery pack 10 further includes at least one of a battery management system (BMS), a battery connector, a battery sampler, and a battery thermal management system, or other components required by a vehicle-use battery. The width direction B of the power battery pack 10 is arranged along a width direction of a vehicle body, that is, a left-right direction of the vehicle, and the length direction of the power battery pack 10 is arranged along a length direction of the vehicle body, that is, a front-rear direction of the vehicle. This application is not limited thereto. The width direction B of the power battery pack 10 may be alternatively arranged along the length direction of the vehicle body, and the length direction A of the power battery pack 10 may be arranged along the width direction of the vehicle body.

A person skilled in the art may understand that, arrangement of a direction of the cells 100 in the power battery pack 10 and arrangement of a direction of the power battery pack 10 on the electric vehicle may be combined in different manners. For example, the length direction of the cell 100 may be arranged along the width direction B of the power battery pack 10, or may be arranged along the length direction A of the power battery pack 10; and the width direction B of the power battery pack 10 may be arranged along the width direction of the vehicle body, or may be arranged along the length direction of the vehicle body. In another example, regardless of whether the width direction B of the power battery pack 10 is arranged along the width direction of the vehicle body or the length direction of the vehicle body, the length direction of the cell 100 is arranged along the width direction of the vehicle body. Relative arrangement directions of the cell 100, the power battery pack 10, and the vehicle body may be set according to actual applications, to meet different requirements.

The cell 100 according to an embodiment of this application is described below with reference to the accompanying drawings.

In the following specific embodiments, a length L, a width H, and a thickness D are all measured in millimeter (mm), a surface area S is measured in square millimeter (mm$^2$), a volume V is measured in cubic millimeter (mm$^3$), and energy E is measured in watt per hour (Wh).

Figure 5:
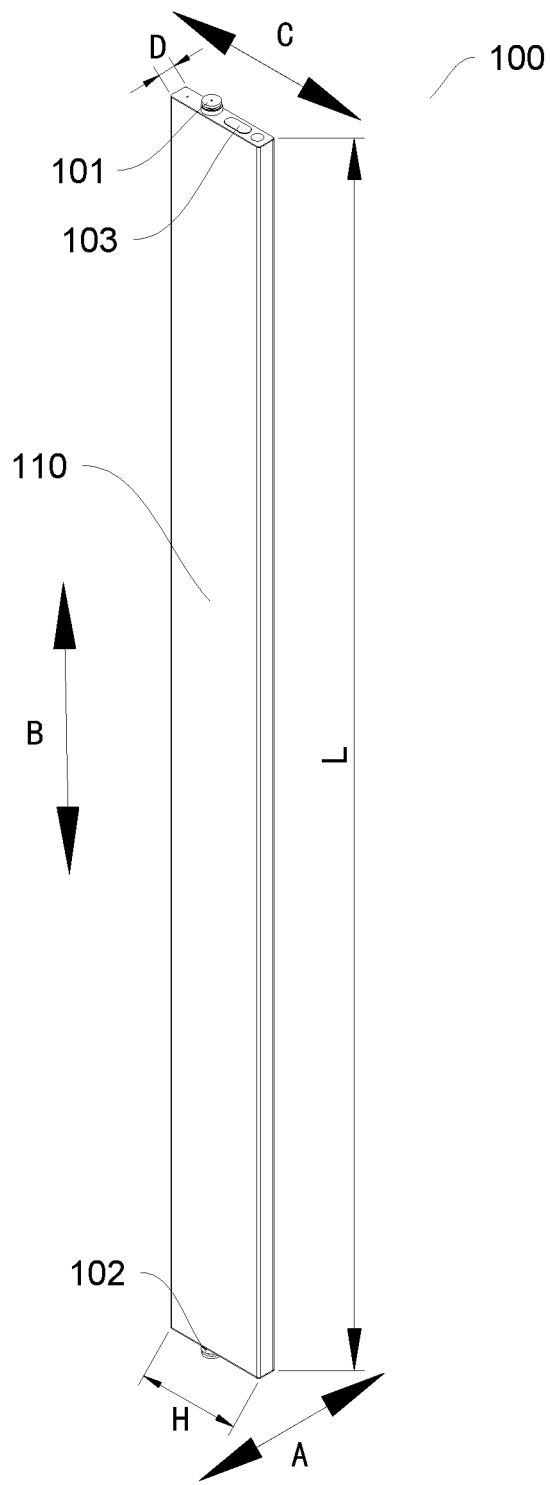
FIG. 5 is a schematic structural diagram of a cell according to an embodiment of this application.

As shown in FIG. 5, the cell 100 according to this embodiment of this application includes a cell body 110. It may be understood that, the cell body 110 is a main portion in addition to small-sized protrusion structures such as an electrode tab). The cell body 110 has a length L, a width H, and a thickness D.

The length L of the cell body 110 is greater than the width H of the cell body 110, the width H of the cell body 110 is greater than the thickness D of the cell body 110, and the length L of the cell body 110 and the width H of the cell body 110 meet: L/H=4 to 21. In some specific embodiments of this application, the length L of the cell body 110 and the width H of the cell body 110 meet: L/H=9 to 13.

During development of the electric vehicle, a requirement on a voltage platform of the cell is pre-determined. In this way, a volume of the cell is a fixed value. That is, in a case that a voltage platform is achieved, based on the use of the same chemical system material, a quantity of materials accommodated in the cell is fixed. Therefore, the volume is a fixed. According to the cell 100 in this embodiment of this application, by designing a ratio of the length L to the width H of the cell body 110, the cell body 110 may be reasonably flattened and elongated under a certain volume. On one hand, it facilitates overall arrangement in the power battery pack (for example, implementing the arrangement of the power battery pack 10 according to the foregoing embodiments of this application), thereby improving the space utilization of the power battery pack, expanding the energy density of the power battery pack, and further prolonging the battery life of the power battery pack; on the other hand, it can be ensured that the cell 100 has a sufficiently large heat dissipation area, and can promptly conduct heat inside the cell to the outside, to prevent the heat from gathering inside the cell, thereby matching relatively high energy density, and supporting the improvement of the battery life.

In some specific embodiments of this application, to optimize the arrangement of the cells 100 in the power battery pack, and improve the heat dissipation capacity of the cells 100, the length L and the thickness D of the cell body 110 meet: L/D=23 to 208. In some other specific embodiments of this application, the length L and the thickness D of the cell body 110 meet: L/D=50 to 120.

In some specific embodiments of this application, as shown in FIG. 5, the cell body 110 is a cuboid structure with a smooth outer surface, which has certain structural strength. For example, a cell core of a cell is inputted into a square cell housing, an opening portion of the cell housing is sealed by using a cover plate, and an electrolyte solution is injected. Compared with a cell with an aluminum-plastic compound film, a heat-conducting property of the cell 100 according to this embodiment of this application is good, and a conventional battery thermal management structure is also used, which can effectively avoid the heat dissipation problem brought by a large-size structure. Compared with a cylindrical cell, the space utilization is higher, and the process of production and assembly is easier.

When the cells 100 according to this embodiment of this application are arranged in the pack body 200 of the power battery pack 10, a length direction and a thickness direction of the cell body 110 may extend along a horizontal direction, and a width direction of the cell body 110 may extend along a vertical direction, that is, the cells 100 are placed sideways. Both the horizontal direction and the vertical direction are subject to a direction of the power battery pack 10 during use (for example, when the power battery pack is applied to the electric vehicle).

In some specific examples of this application, to improve the energy density and the battery life by optimizing the arrangement of the cells 100 in the power battery pack 10, other parameters of the cell 100 are designed, to enable the arrangement of the cell body 110 to be compact and energy to be more concentrated in the limited space of the pack body 200.

In some embodiments of this application, the length L of the cell body 110 and a volume V of the cell body 110 meet: $L/V=0.0005$ mm$^{-2}$ to $0.002$ mm$^{-2}$, for example, $L/V=0.00045$ mm$^{-2}$ to $0.0015$ mm$^{-2}$. In some embodiments of this application, the width H of the cell body 110 and a volume V of the cell body 110 meet: $H/V=0.0001$ mm$^{-2}$ to $0.00015$ mm$^{-2}$. In some embodiments of this application, the thickness D of the cell body 110 and a volume V of the cell body 110 meet: $D/V=0.0000065$ mm$^{-2}$ to $0.00002$ mm$^{-2}$. Therefore, for the cell body 110 with a certain volume, a proportion of each of the length L, the width H, and the thickness D to the volume V is designed, to optimize the distribution of energy per unit quantity in the space, thereby facilitating the arrangement in the pack body 200.

In some embodiments of this application, the length L of the cell body 110 and a surface area S of the cell body 110 meet: $L/S=0.002$ mm$^{-1}$ to $0.005$ mm$^{-1}$, and the length L of the cell body 110 and energy E of the cell body 110 meet: $L/E=0.8$ mm·Wh$^{-1}$ to $2.45$ mm·Wh$^{-1}$. In some embodiments of this application, the length L of the cell body 110 and energy E of the cell body 110 meet: $L/E=1.65$ mm·Wh$^{-1}$ to $2.45$ mm·Wh$^{-1}$. In this way, it facilitates that the cell 100 crosses two opposite sides of the pack body 200 in the length direction of the cell, to improve the battery life of the power battery pack 10, and maintain the structural strength and the heat dissipation effect of the cell 100.

In some other examples of this application, the surface area S of the cell body 110 and the volume V of the cell body 110 meet: $S/V=0.1$ mm$^{-1}$ to $0.35$ mm$^{-1}$. Therefore, not only a sufficient heat dissipation area is ensured, to ensure a heat dissipation effect, but also a volume proportion of the cells 100 may be reduced, facilitating compact arrangement of the plurality of cells 100 in the power battery pack 10.

The surface area S of the cell body 110 and the energy E of the cell body 110 meet: $S/E \leq 1000$ mm·Wh$^{-1}$. In this way, it can be ensured that the surface of the cell 100 has a sufficient heat dissipation area, and in particular, when the cell uses a ternary or high-nickel ternary cathode material, the heat inside the cell can be promptly conducted, facilitating safety of the cell. In addition, the cell 100 in this embodiment of this application is a square cell having a smooth outer surface, certain structural strength, and a good metal heat conducting performance. Compared with a cell of which a surface area is increased by setting corrugation, the process and subsequent assembly has a relatively small difficulty.

In some specific embodiments of this application, as shown in FIG. 5, the cell 100 further includes a first terminal 101 and a second terminal 102.

The first terminal 101 is disposed on an end of the cell body 110 in the length direction of the cell body, and the second terminal 102 is disposed on the other end of the cell body 110 in the length direction of the cell body. In other words, the length direction of the cell 100 may be a current direction inside the cell 100, that is, the current direction inside the cell 100 is shown as the arrow B. In this way, because the current direction is the same as the length direction of the cell 100, the cell 100 has a larger effective heat dissipation area and better heat dissipation efficiency. The first terminal 101 is connected to a positive electrode tab of the cell 100, and the second terminal 102 is connected to a negative electrode tab of the cell 100. Alternatively, the first terminal 101 is connected to a negative electrode tab of the cell 100, and the second terminal 102 is connected to a positive electrode tab of the cell 100.

In some specific examples of this application, as shown in FIG. 5, the cell 100 further includes an explosion-proof valve 103.

The explosion-proof valve 103 is disposed on at least one end of the cell body 110 in the length direction of the cell body. When the cell 100 has a fault and swells, sufficient air pressure is generated inside the cell to break through a flip sheet in the explosion-proof valve 103, thereby short-circuiting the cell 100, ensuring safety of the cell 100, and preventing the cell 100 from exploding.

A person skilled in the art may understand that, the setting of the explosion-proof valve 103 may be not only applied to a battery with an aluminum housing, but also may be applied to a pouch battery. In addition, the explosion-proof valve 103 may be alternatively disposed at other positions than an end portion of the cell body 100.

In some specific embodiments of this application, two ends of the cell body 110 along the length direction of the cell body are each provided with an explosion-proof valve 103, and the explosion-proof valves 103 at the two ends of the cell body 110 discharge gas through different exhaust channels 222.

Figure 2:
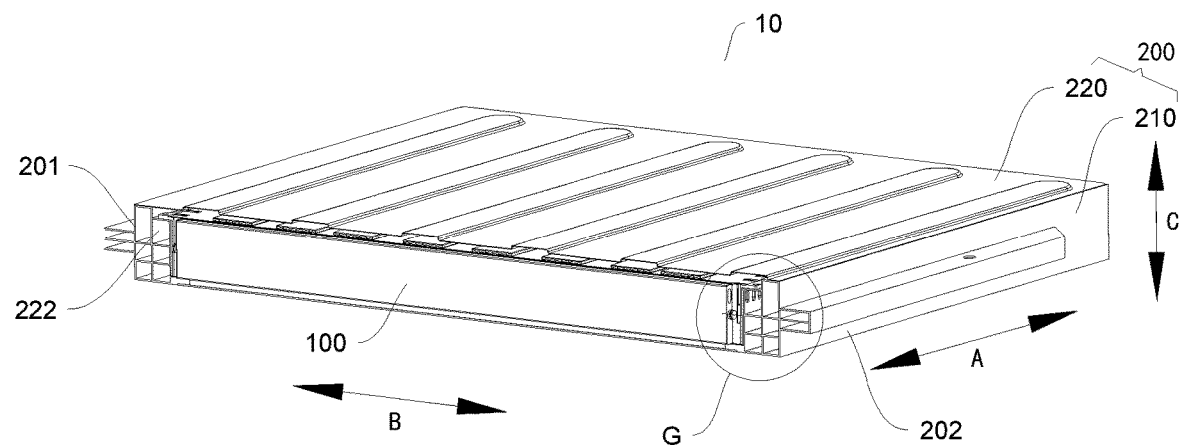
FIG. 2 is a cross-sectional view of a power battery pack according to an embodiment of this application.
Figure 3:
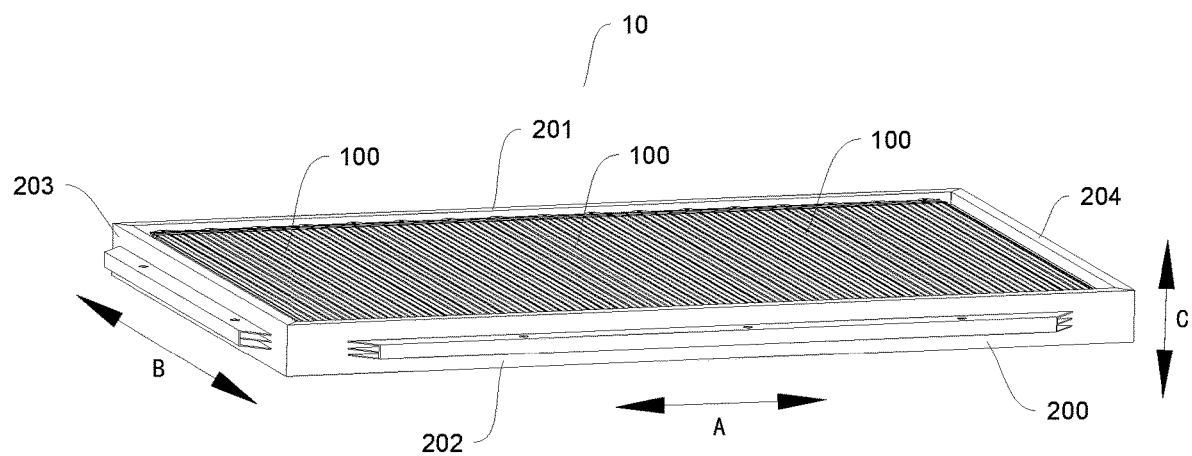
FIG. 3 is a three-dimensional diagram of a power battery pack according to an embodiment of this application.
Figure 4:
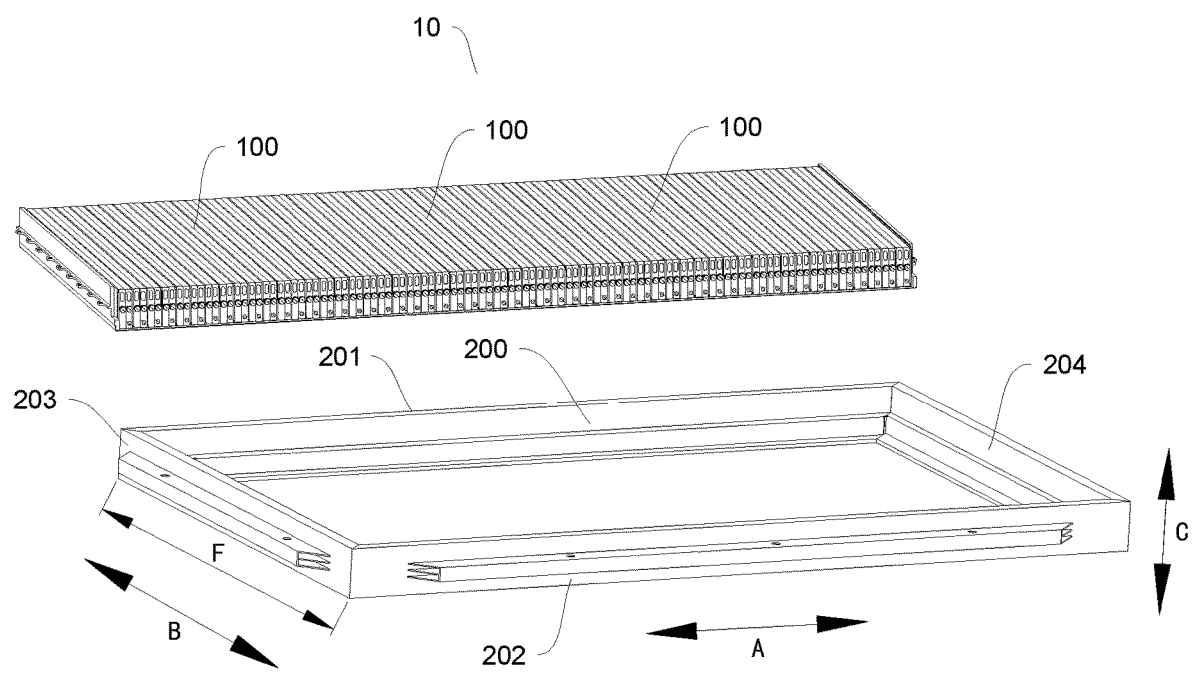
FIG. 4 is an exploded view of a power battery pack according to an embodiment of this application.
Figure 11:
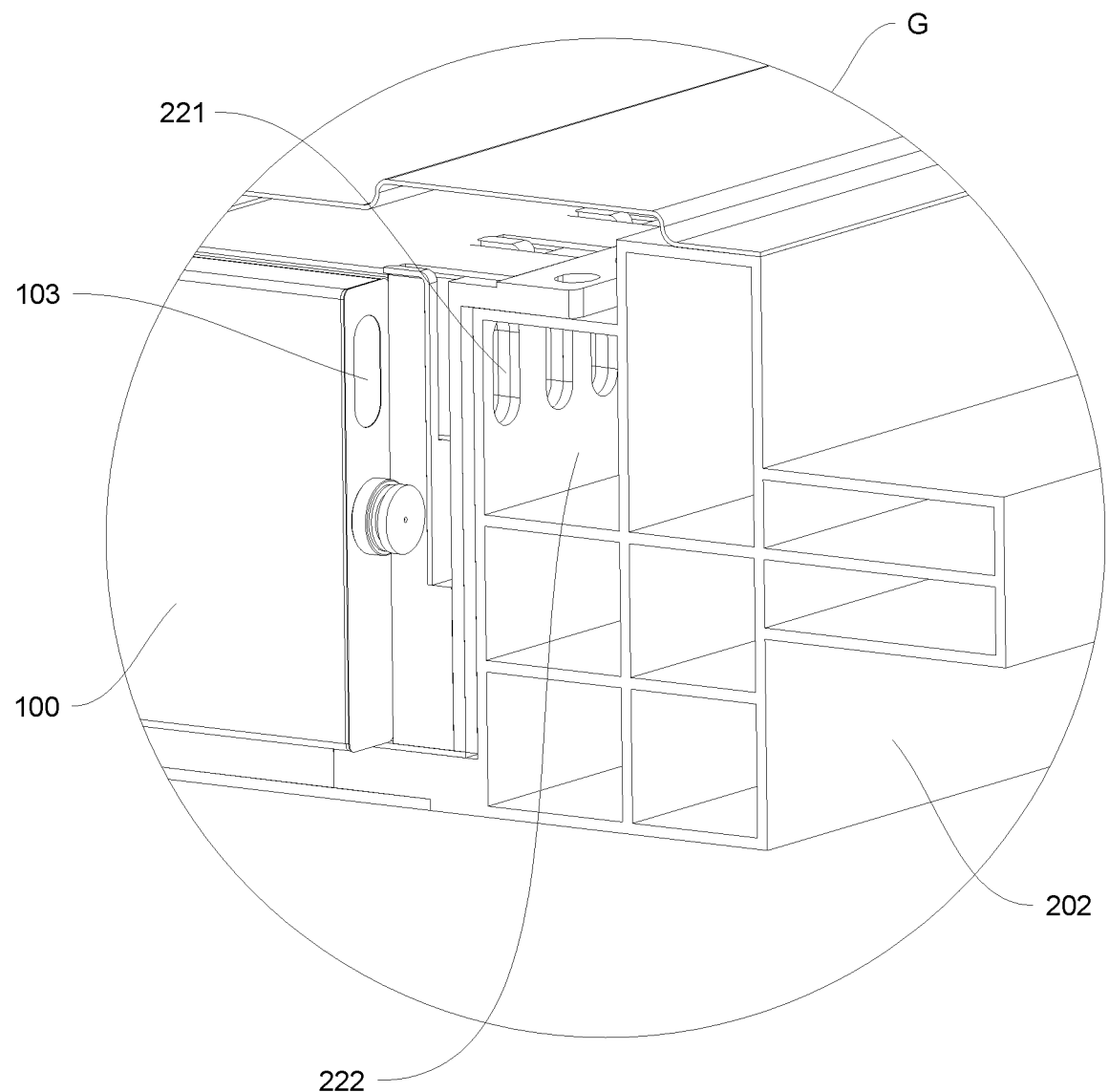
FIG. 11 is an enlarged view of a region G in FIG. 2.

For example, as shown in FIG. 2, FIG. 5 and FIG. 11, an explosion-proof valve 103 is disposed on a first end of the cell 100 facing the first beam 201, the first beam 201 is provided therein with an exhaust channel 222, the first beam 201 is provided with an air inlet 221 at a position corresponding to the explosion-proof valve 103 of each cell 100, the air inlet 221 is in communication with the exhaust channel 222, and the pack body 200 is provided with an exhaust hole in communication with the exhaust channel 222; and/or an explosion-proof valve 103 is disposed on a second end of the cell 100 facing the second beam 202, the second beam 202 is provided therein with an exhaust channel 222, the second beam 202 is provided with an air inlet 221 at a position corresponding to the explosion-proof valve 103 of each cell 100, the air inlet 221 is in communication with the exhaust channel 222, and the pack body 200 is provided with an exhaust hole in communication with the exhaust channel 222.

In the related art, during use of the cell, if the air pressure inside the cell increases to a certain degree, the explosion-proof valve is opened. Flame, smoke, or gas inside the cell is exhausted through the explosion-proof valve. The flame, smoke, or gas gathers inside the power battery pack and causes secondary damage to the cell if not exhausted in time. In the embodiments of this application, because the first beam 201 and/or the second beam 202 are provided with the air inlet 221 corresponding to the explosion-proof valve 103 of each cell 100, and the first beam 201 and/or the second beam 202 are provided therein with the exhaust channel 222, when the air pressure inside the cell 100 increases, the explosion-proof valve 103 of the cell is opened. Flame, smoke, or gas inside the cell directly enters the exhaust channel 222 in the first beam 201 and/or the second beam 202 through the air inlet 221, and is discharged from the first beam 201 and/or the second beam 202 through the exhaust hole, for example, discharged into the atmosphere through the exhaust hole. In this way, the flame, smoke or gas does not gather inside the pack body 200, to prevent the flame, smoke or gas from causing secondary damage to the cell 100.

In addition, an end of each of the plurality of cells 100 discharges gas through the exhaust channel 222 in the first beam 201, and the other end of each of the plurality of cells 100 discharges gas through the exhaust channel 222 in the second beam 202. Therefore, two ends of the cell 100 discharge gas through different channels, which increases a gas discharging distance, and discharges gas in a cross manner, thereby reducing the temperature.

An electric vehicle 1 according to an embodiment of this application is described below with reference to the accompanying drawings. The electric vehicle may include electric vehicles that need a power battery pack to provide electric energy for driving the electric vehicles, such as a commercial vehicle, a special vehicle, an electric bicycle, an electric motorcycle, and an electric scooter.

As shown in FIG. 9 and FIG. 10, the electric vehicle 1 according to this embodiment of this application includes the power battery pack 10 according to the foregoing embodiments of this application. The pack body 200 may be integrally formed on the electric vehicle. Alternatively, the pack body 200 may be a vehicle-use tray that is separately produced and used for accommodating and mounting of the cells 100.

In the electric vehicle 1 according to this embodiment of this application, the power battery pack 10 according to the foregoing embodiments of this application is used, which can improve the battery life without expanding the battery occupation space.

In some specific embodiments of this application, as shown in FIG. 9 and FIG. 10, the power battery pack 10 is disposed at the bottom of the electric vehicle 1, and the pack body 200 is fixedly connected to a chassis of the electric vehicle 1. Because the chassis of the electric vehicle 1 has a relatively large mounting space, as many as cells 100 may be accommodated by disposing the power battery pack 10 on the chassis of the electric vehicle 1, thereby improving the battery life of the electric vehicle 1.

In some specific examples of this application, as shown in FIG. 9 and FIG. 10, the electric vehicle 1 includes one power battery pack 10 disposed at the bottom of the electric vehicle 1, and the pack body 200 is fixedly connected to a chassis of the electric vehicle 1. A width direction of the power battery pack 10 is arranged along a width direction of a vehicle body of the electric vehicle 1, that is, a left-right direction of the electric vehicle 1, and a length direction of the power battery pack 10 is arranged along a length direction of the vehicle body of the electric vehicle 1, that is, a front-rear direction of the electric vehicle 1. In another embodiment, the electric vehicle 1 may include a plurality of power battery packs 10 disposed at the bottom of the electric vehicle 1. The plurality of power battery packs 10 may have the same or different shapes and sizes. Each power battery pack 10 may be adjusted according to a shape and size of the chassis of the electric vehicle 1, and the plurality of power battery packs 10 are arranged along the length direction of the vehicle body, that is, the front-rear direction.

In some specific examples of this application, a ratio of a width F of the pack body 200 to a width W of the vehicle body meets: 50%≤F/W≤80%. In some other embodiments of this application, a length L of the cell body in the width direction of the power battery pack and the width W of the vehicle body meet: 46%≤L/W≤76%. In the foregoing embodiments, the ratio may be achieved by disposing only one pack body 200 along the width direction of the vehicle body. When there are a plurality of pack bodies 200, the plurality of pack bodies 200 are arranged along the length direction of the vehicle body. Usually, for most vehicles, the width W of the vehicle body is 500 mm to 2000 mm, for example, 500 mm, 1600 mm, 1800 mm, and 2000 mm, and the length of the vehicle body is 500 mm to 5000 mm. For a passenger vehicle, a width of the passenger vehicle is usually 500 mm to 1800 mm, and a length of the vehicle body is 500 mm to 4000 mm.

In some other embodiments of this application, a width F of the pack body 200 is 500 mm to 1500 mm, which is much greater than that of the battery pack housing disclosed in the Chinese patent No. CN107925028A, to facilitate in accommodating the cell array 400 of the battery pack in the patent No. CN107925028A, thereby ensuring the battery life, and matching the size of the vehicle body.

In some specific examples of this application, the cell 100 includes a cell body 110, and a ratio of a length L of the cell body 110 to a width W of the vehicle body meets: 46%≤L/W≤76%. In this embodiment, the ratio may be achieved by disposing only one cell 100 along the width direction of the vehicle body. In other possible implementations, in a case that such a dimension requirement is met, the ratio may be achieved by disposing a plurality of cell arrays 400 or a plurality of cells 100 in the length direction. In some embodiments, the length L of the cell body 110 is 600 mm to 2500 mm.

A person skilled in the art may understand that, in some other embodiments of this application, the width direction of the power battery pack 10 may be alternatively arranged along the width direction of the vehicle body of the electric vehicle 1, and the length direction of the power battery pack 10 is arranged along the length direction of the vehicle body of the electric vehicle 1. In this embodiment, the ratio of the width F of the pack body 200 to the width W of the vehicle body and the ratio of the length L of the cell body 110 to the width W of the vehicle body are correspondingly adjusted.

Other configurations and operations of the cell 100, the power battery pack 10, and the electric vehicle 1 according to the embodiments of this application are known to a person of ordinary skill in the art and are not be described in detail herein.

Description is performed below through Comparative example 1 and Embodiments 1 to 3, Comparative example 2 and Embodiments 4 and 5, and Comparative example 3 and Embodiments 6 and 7. According to the power battery pack 10 in the embodiments of this application, energy density and the like are improved through design of arrangement and a dimension parameter, and the like of the cell 100.

The embodiments and comparative examples below all use a lithium iron phosphate battery with a battery level being 73 kwh as an example.

In Comparative example 1 and Embodiments 1 to 3, a total volume of the power battery pack is 213 L, a length of the pack body is 1380, a width is 1005, and a thickness is 13. A sum of a volume of the housing such as a tray and an upper cover and a volume occupied by the internal battery management system and other power distribution modules is 58 L. An actual remaining volume that can accommodate cells and/or a widthwise cross beam or a lengthwise cross beam is 155 L.

Comparative Example 1

For the power battery pack 10' in the related art, as shown in FIG. 1, the pack body 200" is provided therein with two widthwise cross beams 500' and one lengthwise cross beam 600'. The two widthwise cross beams 500' and the lengthwise cross beam 600' divide cells into six battery modules 400', each of the battery modules 400' having a battery pack housing.

Embodiment 1

Figure 12:
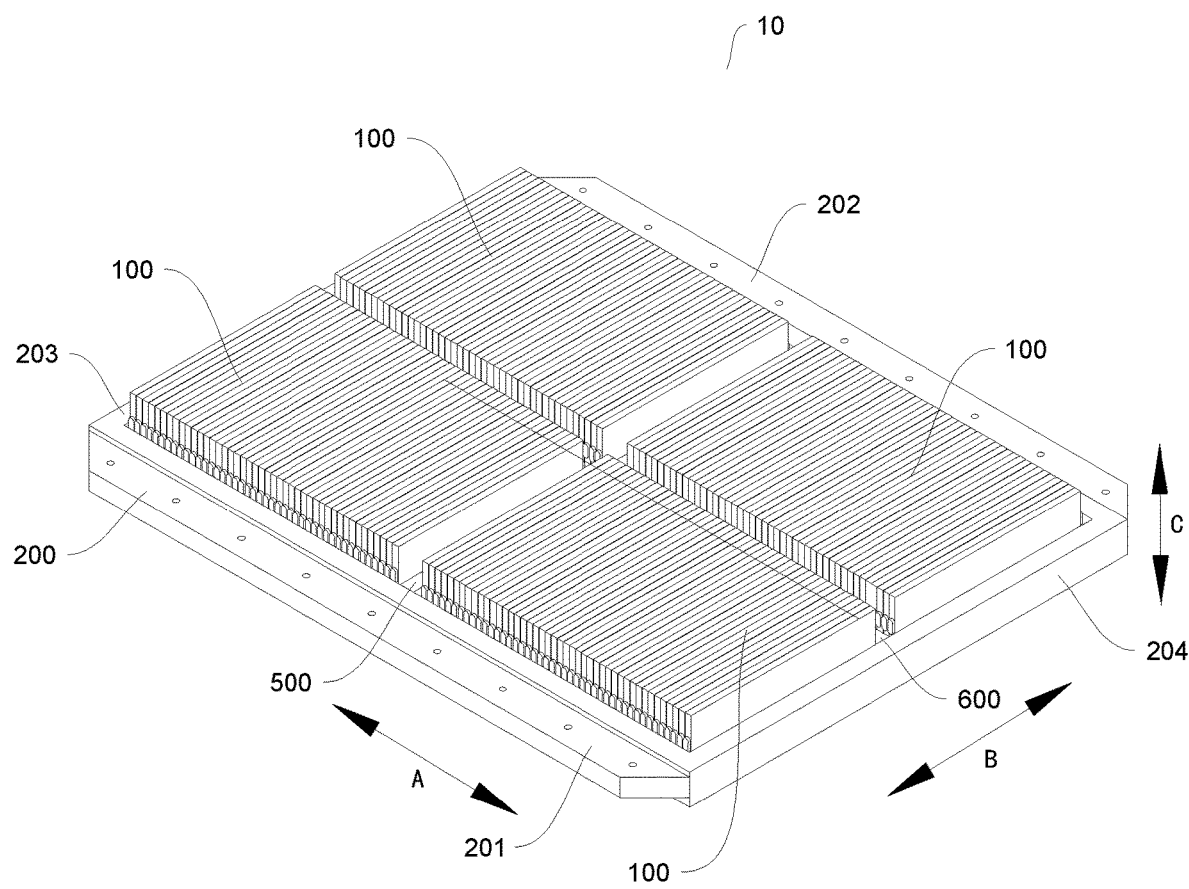
FIG. 12 is a three-dimensional diagram of a power battery pack according to a first optional embodiment of this application.

According to the power battery pack 10 in this embodiment of this application, as shown in FIG. 12, a length direction of the cell 100 is arranged along the width direction B of the power battery pack, the plurality of cells 100 are arranged along the length direction A of the power battery pack 10, and in the width direction B of the power battery pack, the pack body 200 accommodates two cells 100. The pack body 200 is provided therein with one widthwise cross beam 500 and one lengthwise cross beam 600, and the widthwise cross beam 500 extends along the width direction B of the power battery pack 10. The plurality of cells 100 are arranged along the length direction A of the power battery pack 10 to form a cell array, and the widthwise cross beam 500 divides the cell array into at least two parts along the length direction A of the power battery pack 10. In addition, for the plurality of cells 100, two rows of cell arrays are disposed along the width direction B of the power battery pack. The lengthwise cross beam 600 is located between two neighboring rows of cell arrays. A first beam 201 and a second beam 202 located at two sides of the pack body 200 in the width direction B of the power battery pack 10 provide supporting forces for the cells 100. A third beam 203 and a fourth beam 204 located at two ends of the pack body 200 in the length direction A of the power battery pack 10 provide inward pressing forces for cells 100 adjacent to thereof. Neither an end plate nor a side plate is disposed for the cell array of the power battery pack 10.

Embodiment 2

According to the power battery pack 10 in this embodiment of this application, as shown in FIG. 13, a length direction of the cell 100 is arranged along the width direction B of the power battery pack, the plurality of cells 100 are arranged along the length direction A of the power battery pack 10. In the width direction B of the power battery pack, the pack body 200 accommodates one cell 100, and the cell 100 extends from one side to another side of the pack body 200 in the width direction B of the power battery pack 10. The pack body 200 is provided therein with one widthwise cross beam 500 and no lengthwise cross beam 600, and the widthwise cross beam 500 extends along the width direction B of the power battery pack 10. The plurality of cells 100 are arranged along the length direction A of the power battery pack 10 to form a cell array, and the widthwise cross beam 500 divides the cell array into at least two parts along the length direction A of the power battery pack 10. A first beam 201 and a second beam 202 located at two sides of the pack body 200 in the width direction B of the power battery pack 10 provide supporting forces for the cells 100. A third beam 203 and a fourth beam 204 located at two ends of the pack body 200 in the length direction A of the power battery pack 10 provide inward pressing forces for cells 100 adjacent to thereof. Neither an end plate nor a side plate is disposed for the cell array of the power battery pack 10.

Embodiment 3

According to the power battery pack 10 in this embodiment of this application, as shown in FIG. 14, a length direction of the cell 100 is arranged along the width direction B of the power battery pack, the plurality of cells 100 are arranged along the length direction A of the power battery pack 10. In the width direction B of the power battery pack, the pack body 200 accommodates one cell 100, and the cell 100 extends from one side to another side of the pack body 200 in the width direction B of the power battery pack 10. Neither the widthwise cross beam 500 nor the lengthwise cross beam 600 is disposed in the pack body 200. A first beam 201 and a second beam 202 located at two sides of the pack body 200 in the width direction B of the power battery pack 10 provide supporting forces for the cells 100. A third beam 203 and a fourth beam 204 located at two ends of the pack body 200 in the length direction A of the power battery pack 10 provide inward pressing forces for cells 100 adjacent to thereof. Neither an end plate nor a side plate is disposed for the cell array of the power battery pack 10.

It may be known by a person skilled in the art by comparing the foregoing Comparative example 1 and Embodiments 1 to 3 that, compared with the power battery pack 10' in the related art, for the power battery pack 10 according to the embodiments of this application, the space utilization can break through a limit of an existing power battery pack through design of arrangement, size parameters, and other factors of the cell 100, to achieve greater energy density.

In Comparative example 2 and Embodiments 4 and 5, a total volume of the power battery pack is 310 L, a length of the pack body is 1580, a width is 1380, and a thickness is 137. A sum of a volume of the housing such as a tray and an upper cover and a volume occupied by the internal battery management system and other power distribution modules is 89 L. An actual remaining volume that can accommodate cells and/or a widthwise cross beam or a lengthwise cross beam is 221 L.

Comparative Example 2

For the power battery pack 10' in the related art, as shown in FIG. 1, the pack body 200" is provided therein with two widthwise cross beams 500' and one lengthwise cross beam 600'. The two widthwise cross beams 500' and the lengthwise cross beam 600' divide cells into six battery modules 400', each of the battery modules 400' having a side plate and an end plate.

Embodiment 4

According to the power battery pack 10 in this embodiment of this application, as shown in FIG. 15, a length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to another side of the pack body 200 in the length direction A of the power battery pack 10. The pack body 200 is provided therein with one lengthwise cross beam 600 and no widthwise cross beam 500, and the lengthwise cross beam 600 extends along the length direction A of the power battery pack 10. The plurality of cells 100 are arranged along the width direction B of the power battery pack 10 to form a cell array, and the lengthwise cross beam 600 divides the cell array into two parts along the width direction B of the power battery pack 10. A third beam 203 and a fourth beam 204 located at two ends of the pack body 200 in the length direction A of the power battery pack 10 provide supporting forces for the cells 100. A first beam 201 and a second beam 202 located at two sides of the pack body 200 in width direction B of the power battery pack 10 provide inward pressing forces for cells 100 adjacent to thereof. Neither an end plate nor a side plate is disposed for the cell array of the power battery pack 10.

Embodiment 5

Figure 16:
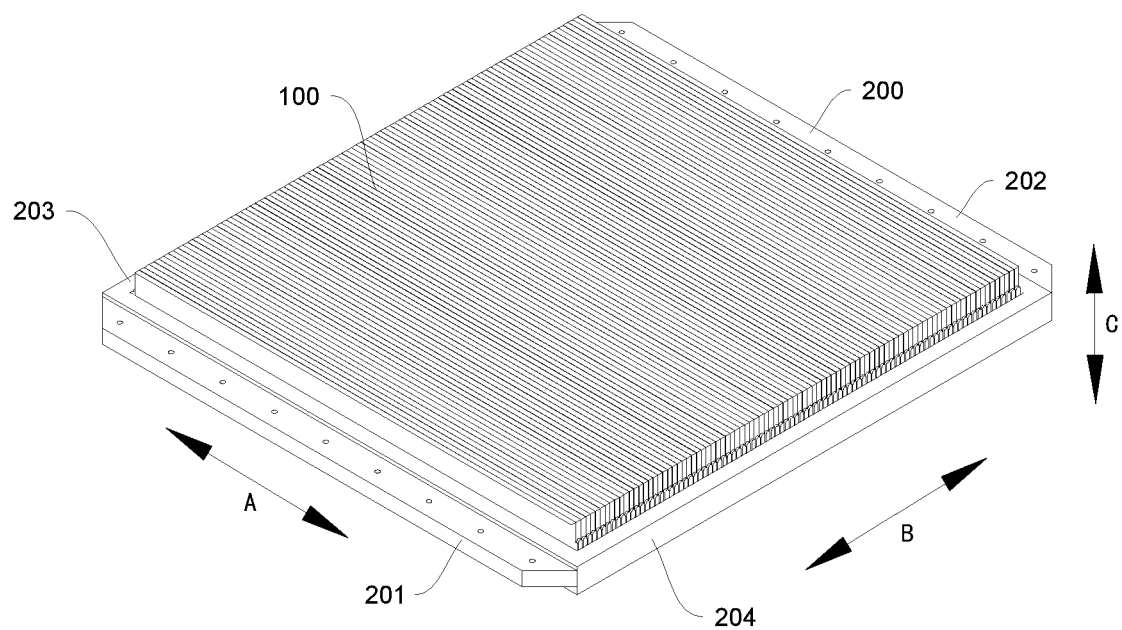
FIG. 16 is a three-dimensional diagram of a power battery pack according to a fifth optional embodiment of this application.

According to the power battery pack 10 in this embodiment of this application, as shown in FIG. 16, a length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to another side of the pack body 200 in the length direction A of the power battery pack 10. Neither the widthwise cross beam 500 nor the lengthwise cross beam 600 is disposed in the pack body 200. A third beam 203 and a fourth beam 204 located at two ends of the pack body 200 in the length direction A of the power battery pack 10 provide supporting forces for the cells 100. A first beam 201 and a second beam 202 located at two sides of the pack body 200 in width direction B of the power battery pack 10 provide inward pressing forces for cells 100 adjacent to thereof. Neither an end plate nor a side plate is disposed for the cell array of the power battery pack 10.

In Comparative example 3 and Embodiment 6, a total volume of the power battery pack is 414 L, a length of the pack body is 2130, a width is 1380, and a thickness is 137. A sum of a volume of the housing such as a tray and an upper cover and a volume occupied by the internal battery management system and other power distribution modules is 58 L. An actual remaining volume that can accommodate cells and/or a widthwise cross beam or a lengthwise cross beam is 312 L.

In Embodiment 7, a total volume of the power battery pack is 508 L, a length of the pack body is 2630, a width is 1380, and a thickness is 137. A sum of a volume of the housing such as a tray and an upper cover and a volume occupied by the internal battery management system and other power distribution modules is 119 L. An actual remaining volume that can accommodate cells and/or a widthwise cross beam or a lengthwise cross beam is 389 L.

Comparative Example 3

For the power battery pack 10' in the related art, as shown in FIG. 1, the pack body 200" is provided therein with two widthwise cross beams 500' and one lengthwise cross beam 600'. The two widthwise cross beams 500' and the lengthwise cross beam 600' divide cells into six battery modules 400', each of the battery modules 400' having a battery pack housing.

Embodiment 6 and Embodiment 7

According to the power battery pack 10 in this embodiment of this application, as shown in FIG. 16, a length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to another side of the pack body 200 in the length direction A of the power battery pack 10. Neither the widthwise cross beam 500 nor the lengthwise cross beam 600 is disposed in the pack body 200. A third beam 203 and a fourth beam 204 located at two ends of the pack body 200 in the length direction A of the power battery pack 10 provide supporting forces for the cells 100. A first beam 201 and a second beam 202 located at two sides of the pack body 200 in width direction B of the power battery pack 10 provide inward pressing forces for cells 100 adjacent to thereof. Neither an end plate nor a side plate is disposed for the cell array of the power battery pack 10.

Specific parameters of Embodiments 1 to 7 and Comparative examples 1 to 3 are shown in Table 1.

TABLE 1

| | Comparative example 1 | Embodiment 1 | Embodiment 2 | Embodiment 3 | Comparative example 2 | Embodiment 4 | Embodiment 5 | Comparative example 3 | Embodiment 6 | Embodiment 7 |
|---|---|---|---|---|---|---|---|---|---|---|
| Size of a cell: length, width, and height | 208*118*13.5 | 435*118*13.5 | 905*118*13.5 | 905*118*13.5 | 208*118*13.5 | 1280*118*13.5 | 1280*118*13.5 | 208*118*13.5 | 2000*118*13.5 | 2500*118*13.5 |
| Quantity | 352 | 176 | 88 | 92 | 500 | 90 | 93 | 752 | 94 | 94 |
| Capacity (Ah) of the cell | 47.5 | 95 | 202 | 202 | 47.5 | 286 | 286 | 47.5 | 448 | 561 |
| Battery level (Wh) of the cell | 152 | 304 | 646.4 | 646.4 | 152 | 915.2 | 915.2 | 152 | 1434 | 1795 |
| Volume (L) of the cell | 0.331 | 0.693 | 1.442 | 1.442 | 0.331 | 2.039 | 2.039 | 0.331 | 3 | 4 |
| Volume (L) of an accommodating chamber of the cell | 150 | 151 | 152 | 155 | 219 | 220 | 221 | 334 | 356 | 389 |
| Cell VED (Wh/L) | 459 | 439 | 448 | 448 | 459 | 449 | 449 | 459 | 450 | 451 |
| Size (mm) of a vehicle body in an extending direction of the cell | 1880 | 1880 | 1880 | 1880 | 1950 | 1950 | 1950 | 4700 | 4700 | 5200 |
| Area (mm$^2$) of orthographic projections of the cell at a base plate | 988416 | 1033560 | 1075140 | 1124010 | 1404000 | 1555200 | 1607040 | 2111616 | 2538000 | 3172500 |
| Total area (mm$^2$) of the base plate | 1386900 | 1386900 | 1386900 | 1386900 | 2180400 | 2180400 | 2180400 | 2939400 | 2939400 | 3629400 |

TABLE 1-continued

| | Comparative example 1 | Embodiment 1 | Embodiment 2 | Embodiment 3 | Comparative example 2 | Embodiment 4 | Embodiment 5 | Comparative example 3 | Embodiment 6 | Embodiment 7 |
|---|---|---|---|---|---|---|---|---|---|---|
| Battery level (Wh) of Pack | 53504 | 53504 | 56883.2 | 59468.8 | 76000 | 82368 | 85113.6 | 114304 | 134758.4 | 168748.8 |
| Total volume (L) of Pack | 213 | 213 | 213 | 213 | 310 | 310 | 310 | 414 | 414 | 508 |
| Energy density (Wh/L) of Pack | 251 | 252 | 268 | 280 | 245 | 266 | 275 | 276 | 326 | 332 |
| Space utilization (%) | 54.76% | 57.39% | 59.70% | 62.41% | 53.49% | 59.25% | 61.23% | 60.23% | 72.39% | 73.66% |
| Total volume of the cell/Volume of the accommodating chamber of the cell | 77.76% | 80.77% | 83.46% | 85.57% | 75.65% | 83.42% | 85.81% | 74.63% | 84.13% | 96.33% |
| Length of the cell/Width of the vehicle body along the extending direction of the cell | 44.26% | 46.28% | 48.14% | 48.14% | 42.67% | 65.64% | 65.64% | 35.40% | 42.55% | 48.08% |
| Total area of the orthographic projections of the cell at the base plate/Area of the base plate | 71.27% | 74.52% | 77.52% | 81.04% | 64.39% | 71.33% | 73.70% | 71.84% | 86.34% | 87.41% |

It may be known by a person skilled in the art by comparing the foregoing Comparative example 1 and Embodiments 1 to 3 that, compared with the power battery pack 10' in the related art, for the power battery pack 10 according to the embodiments of this application, the space utilization can break through a limit of an existing power battery pack through design of arrangement, size parameters, and other factors of the cell 100, to achieve greater energy density.

It may be known by a person skilled in the art by comparing the foregoing Comparative example 2 to Embodiments 4 and 5, and Comparative example 3 to Embodiments 6 and 7 that, for the power battery pack 10 according to the embodiments of this application, the space utilization can break through a limit of an existing power battery pack through design of arrangement, size parameters, and other factors of the cell 100, to achieve greater energy density. In addition, the increase in energy density is magnified as an overall volume of the power battery pack is increased. In other words, for a power battery pack with a larger volume, energy density is more significantly improved by using the solution of the embodiments of this application.

In the description of this specification, description of reference terms such as "a specific embodiment" or "a specific example", means including specific features, structures, materials, or features described in the embodiment or example in at least one embodiment or example of this application. In this specification, exemplary descriptions of the foregoing terms do not necessarily refer to the same embodiment or example.

Although the embodiments of this application have been shown and described, a person of ordinary skill in the art should understand that various changes, modifications, replacements and variations may be made to the embodiments without departing from the principles and spirit of this application, and the scope of this application is as defined by the appended claims and their equivalents.

What is claimed is:

1. A power battery pack, comprising:
    a pack body having an accommodating space and a middle cross beam, and the middle cross beam dividing the accommodating space into at least two accommodating chambers; and
    a plurality of cells disposed in the accommodating chambers, wherein each cell of the plurality of cells has a first end portion and a second end portion opposite the first end portion along a length direction of the cell and at least one cell is arranged in each accommodating chamber to form a cell array,
    a first side beam disposed on a first side of the accommodating space; and
    a second side beam disposed on a second side of the accommodating space opposite the first side beam;
    wherein each of the cells of the plurality of cells is disposed in one of the accommodating chambers with one of the first and second end portions of the cell supported by one of the side beams and the other of the first and second end portions of the cell supported by the middle cross beam.

2. The power battery pack according to claim 1, wherein the middle cross beam extends along a width direction of the power battery pack and the at least one cell in each accommodating chamber extends from one side of the corresponding accommodating to an opposite side of the corresponding accommodating chamber along a length direction of the power battery pack.

3. The power battery pack according to claim 2, wherein the length direction of each of the cells of the plurality of cells is disposed along the length direction of the power battery pack, and the plurality of cells are disposed along the width direction of the power battery pack, and
    wherein only one cell is accommodated in each accommodating chamber along the length direction of the power battery pack.

4. The power battery pack according to claim 2, wherein each cell has a length L0, the length direction of each cell is disposed along the length direction of the power battery pack, and the plurality of cells are disposed along the width direction of the power battery pack; and wherein a distance along the length direction of the power pack between a first end of each cell and a side wall of the accommodating chamber adjacent to the first end of the cell is L1 a distance along the length direction of the power battery pack between a second end of the cell and a side wall of the accommodating chamber adjacent to the second end of the cell is L2, and the length L0 meets: L1+L2<L0.

5. The power battery pack according to claim 1, wherein at least two layers of cell arrays are disposed in the pack body along a height direction of the power battery pack.

6. The power battery pack according to claim 1, wherein the first side beam and the second side beam each extend along a length direction of the power battery pack, and the middle cross beam is a widthwise cross beam extending along a width direction of the power battery pack.

7. The power battery pack according to claim 6, wherein the pack body comprises a base plate, a first end beam extending along the width direction of the power battery pack on a third side of the accommodating space, and a second end beam extending along the width direction of the power battery pack on a fourth side of the accommodating space opposite the first end beam;

wherein the first end beam, the second beam, the first side beam, and the second side beam are fixed together to form a rectangular frame; and wherein the rectangular frame and the base plate define the accommodating space and the first and second end beams each provide inward pressing forces on cells of the plurality of cells adjacent to the respective end beam.

8. The power battery pack according to claim 7, wherein the rectangular frame and the base plate form a vehicle-use tray, and the first and second side beams each include a lifting lug configured to mount the power battery pack on a vehicle.

9. The power battery pack according to claim 8, wherein each lifting lug includes a mounting hole through which the pack body is mounted on the vehicle.

10. The power battery pack according to claim 1, wherein the middle cross beam is a lengthwise cross beam extending along a length direction of the power battery pack and the at least one cell in each accommodating chamber extends from one side of the corresponding accommodating chamber to an opposite side of the corresponding accommodating chamber along a width direction of the power battery pack.

11. The power battery pack according to claim 10, wherein the length direction of each cell of the plurality of cells is arranged along the width direction of the power battery pack; and the plurality of cells are arranged along the length direction of the power battery pack; and wherein only one cell is accommodated in each accommodating chamber along the width direction of the power battery pack.

12. The power battery pack according to claim 10, wherein each of the cells of the plurality of cells has a length of L0, the length direction of each cell is disposed along the width direction of the power battery pack and the plurality of cells are disposed along the length direction of the power battery pack; and wherein a shortest along the width direction of the power battery pack between a first end of each cell and a side wall of the accommodating chamber adjacent to the first end is L1, a distance along the width direction of the battery pack between a second end of the cell and a side wall of the accommodating chamber adjacent to the second end of the cell is L2, and the length L0 meets: L1+L2<L0.

13. The power battery pack according to claim 10, wherein at least two layers of cell arrays are disposed in the pack body along a height direction of the power battery pack.

14. The power battery pack according to claim 1, wherein the first side beam and the second side beam each extend along a width direction of the power battery pack, and the middle cross beam is a widthwise cross beam extending along the width direction of the power battery pack.

15. The power battery pack according to claim 14, wherein the pack body comprises a base plate, a first end beam extending along a length direction of the power battery pack on a third of the accommodating space, and a second end beam extending along the length direction of the power battery pack on a fourth side of the accommodating space opposite the first end beams;

wherein the first side beam, the second beam, the first end beam, and the second end beam are fixed together to form a rectangular frame; and wherein the rectangular frame and the base plate define the accommodating space; and the first second end beams each provide inward pressing forces on cells of the plurality of cells adjacent to the respective end beam.

16. The power battery pack according to claim 15, wherein the rectangular frame and the base plate form a vehicle-use tray, and the first and second side beams each include lifting lug configured to mount the power battery pack is mounted on a vehicle.

17. The power battery pack according to claim 16, wherein each lifting lug includes a mounting hole through which the pack body is mounted on the vehicle.

18. The power battery pack according to claim 1, wherein a sum V1 of volumes of the plurality of cells and a volume V2 of the power battery pack meet: V1/V2≥55%.

19. The power battery pack according to claim 18, wherein V1/V2260%.

20. The power battery pack according to claim 1, wherein a sum V1 of volumes of the plurality of cells and a volume V0 of the accommodating space meet: 81%≤V1/V0≤97%.

21. The power battery pack according to claim 1, wherein the accommodating space has a bottom surface having an area S0, and wherein a sum S1 of areas of orthographic projections of the plurality of cells on the bottom surface meets: 72%≤S1/S0≤88%.

22. The power battery pack according to claim 1, further comprising at least one of a battery management system and a battery thermal management system.

23. The power battery pack according to claim 1, wherein the pack body is integrally formed on an electric vehicle.

24. The power battery pack according to claim 1, wherein each cell of the plurality of cells comprises a cell body having a length L, a width H, and a thickness D, the length L being greater than the width H, the width H being greater than the thickness D, and the length L and the width H meeting: L/H=4 to 21.

25. The power battery pack according to claim 1, wherein each cell of the plurality of cells comprises a cell body and having a length L and a thickness D meeting: L/D=23 to 208.

26. The power battery pack according to claim 1, wherein each cell of the plurality of cells comprises a cell body having a length L and a volume V meeting: L/V=0.0005 mm 2 to 0.002 mm$^{-2}$.

27. The power battery pack according to claim 1, wherein each cell of the plurality of cells comprises a cell body having a width H and a volume V meeting: $H/V=0.0001$ $mm^{-2}$ to $0.00015$ $mm^{-2}$.

28. The power battery pack according to claim 1, wherein each cell of the plurality of cells comprises a cell body having a thickness D and a volume meeting: $D/V=0.0000065$ $mm^{-2}$ to $0.00002$ $mm^{-2}$.

29. The power battery pack according to claim 1, wherein each cell of the plurality of cells comprises a cell body having a length L and a total outer surface area S meeting: $L/S=0.002$ $mm^{-1}$ to $0.005$ $mm^{-1}$.

30. The power battery pack according to claim 1, wherein each cell of the plurality of cells comprises a cell body having a total outer surface area S and a volume V meeting: $S/V=0.1$ $mm^{-1}$ to $0.35$ $mm^{-1}$.

31. The power battery pack according to claim 1, wherein each cell of the plurality of cells comprises a cell body having a length between 700 mm and 2500 mm.

32. The power battery pack according to claim 1, wherein each cell of the plurality of cells is a square battery having an aluminum housing, a cell body, and an explosion-proof valve disposed in an end of the cell body.

33. The power battery pack according to claim 1, wherein each cell comprises a cell body having a first end a second end opposite the first end along a length direction of the cell body, a first explosion-proof valve in the first end, and a second explosion-proof valve in the second end; and wherein the first explosion-proof is configured to discharge gas through a first exhaust channel and the second explosion-proof valve is configured to discharge gas through a second exhaust channel.

\* \* \* \* \*